US012682804B2

(12) United States Patent
Liu et al.

(10) Patent No.: US 12,682,804 B2
(45) Date of Patent: Jul. 14, 2026

(54) METHOD FOR GENERATING OVERDRIVING VOLTAGE BASED ON TEMPERATURE OF PANEL

(71) Applicant: Novatek Microelectronics Corp., Hsinchu (TW)

(72) Inventors: Hua-Wei Liu, New Taipei City (TW); Chih-Chang Lai, Taichung City (TW); Xuan-Yong Lin, Hsinchu City (TW); Wan-Nung Tsung, Taipei City (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/945,447

(22) Filed: Nov. 12, 2024

(65) Prior Publication Data

US 2026/0065828 A1 Mar. 5, 2026

Related U.S. Application Data

(63) Continuation-in-part of application No. 18/818,621, filed on Aug. 29, 2024, now Pat. No. 12,498,829.

(51) Int. Cl.
*G09G 3/20* (2006.01)

(52) U.S. Cl.
CPC ......... *G09G 3/2007* (2013.01); *G09G 3/2003* (2013.01); *G09G 2320/0252* (2013.01); *G09G 2320/046* (2013.01); *G09G 2320/0666* (2013.01)

(58) Field of Classification Search
CPC ............... G09G 3/2007; G09G 3/2003; G09G 2320/0252; G09G 2320/046; G09G 2320/0666
See application file for complete search history.

(56) References Cited

U.S. PATENT DOCUMENTS

| | | | | |
|---|---|---|---|---|
| 7,791,583 | B2 | 9/2010 | Lin et al. | |
| 9,053,674 | B2 | 6/2015 | Chen et al. | |
| 10,698,546 | B1 * | 6/2020 | Withers | G06F 3/0416 |

(Continued)

FOREIGN PATENT DOCUMENTS

| | | |
|---|---|---|
| CN | 107870687 | 4/2018 |
| CN | 114387910 | 4/2022 |

(Continued)

OTHER PUBLICATIONS

"Office Action of Taiwan Related Application, Application No. 113139470", issued on Mar. 7, 2025, p. 1-p. 7.

(Continued)

*Primary Examiner* — Hong Zhou
(74) *Attorney, Agent, or Firm* — JCIPRNET

(57) ABSTRACT

A method for generating overdriving voltage based on temperature of panel is disclosed. The method includes the following steps. A built-in temperature detector of a controller senses temperature of the panel to generate a sensing temperature value. Alternatively, the controller calculates a sensing temperature value, according to lookup information and raw data. The raw data is obtained according to touch sensing signals output from multiple touch sensors. Then, the controller generates an overdriving voltage, according to the sensing temperature value and another lookup information. The controller outputs the overdriving voltage to the pixel circuit.

12 Claims, 21 Drawing Sheets

(56) References Cited

U.S. PATENT DOCUMENTS

| | | | | |
|---|---|---|---|---|
| 11,315,486 | B1 | 4/2022 | Su et al. | |
| 2007/0075951 | A1 * | 4/2007 | Lin | G09G 3/3648 345/89 |
| 2008/0231624 | A1 * | 9/2008 | Poon | G09G 3/3611 345/212 |
| 2011/0063337 | A1 | 3/2011 | Lin et al. | |
| 2012/0092387 | A1 | 4/2012 | Yang et al. | |
| 2013/0076799 | A1 * | 3/2013 | Wurzel | G01K 1/026 345/690 |
| 2013/0169613 | A1 | 7/2013 | Chen et al. | |
| 2013/0249932 | A1 * | 9/2013 | Siotis | G09G 3/20 345/589 |
| 2017/0242505 | A1 * | 8/2017 | Vandermeijden | G01K 3/14 |
| 2018/0182347 | A1 * | 6/2018 | Zhang | G09G 3/3607 |
| 2022/0108652 | A1 | 4/2022 | Su et al. | |
| 2022/0317818 | A1 * | 10/2022 | Furukawa | G06F 3/0412 |
| 2023/0098236 | A1 | 3/2023 | Tadele et al. | |
| 2023/0186837 | A1 | 6/2023 | Hyeon et al. | |
| 2024/0152228 | A1 | 5/2024 | Lee et al. | |
| 2024/0265852 | A1 | 8/2024 | Cho et al. | |
| 2024/0310949 | A1 * | 9/2024 | Jung | G06F 3/04164 |

FOREIGN PATENT DOCUMENTS

| | | |
|---|---|---|
| CN | 116597794 | 8/2023 |
| CN | 118471109 | 8/2024 |
| TW | I310169 | 5/2009 |
| TW | 201218151 | 5/2012 |
| TW | 201329944 | 7/2013 |
| TW | I660300 | 5/2019 |
| TW | 202420050 | 5/2024 |

OTHER PUBLICATIONS

"Office Action of Taiwan Counterpart Application", issued on Sep. 25, 2025, p. 1-p. 6.

"Notice of allowance of Taiwan Counterpart Application", issued on Feb. 26, 2026, p. 1-p. 4.

* cited by examiner

| Temperature(°C) | offset voltage value (V) |
| --- | --- |
| -25 | +2detV1 |
| 0 | +detV1 |
| 25 (Room temperature) | 0 |
| 40 | -detV1 |
| 70 | -2detV1 |

511

DT

FIG. 5

| Temperature(˚C) | offset voltage value (V) |
|---|---|
| -25 | -2detV1 |
| 0 | -detV1 |
| 25 (Room temperature) | 0 |
| 40 | +detV1 |
| 70 | +2detV1 |

811

DT

FIG. 8

METHOD FOR GENERATING OVERDRIVING VOLTAGE BASED ON TEMPERATURE OF PANEL

CROSS-REFERENCE TO RELATED APPLICATION

This application is a continuation-in-part application of and claims the priority benefit of a prior application Ser. No. 18/818,621, filed on Aug. 29, 2024. The entirety of the above-mentioned patent application is hereby incorporated by reference herein and made a part of this specification.

BACKGROUND

Technical Field

This disclosure relates to an operating method, and in particular to an operating method adapted to a panel, for generating an overdriving voltage of the panel.

Description of Related Art

In general, the panel may modulate the voltage for displaying the screen according to the temperature of the panel. The modulated voltage may be an overdrive voltage to reduce the response time when the grey levels of the panels are in transition. However, the temperature is sensed by a temperature detector of the panel, and the sensed temperature is processed by an external processing unit to generate the overdrive voltage. Then, the driving integrated circuit (IC) of the panel receives the overdrive voltage output from the external processing unit, and drives the panel according to the overdrive voltage. Such that, with the temperature detector and the external processing unit, the current panel has high cost, and may not be utilized in a narrow frame application.

SUMMARY

Embodiments of the disclosure provide an operating method, adapted to a panel, and capable of reducing the cost for generating an overdriving voltages.

The operating method of the embodiment of the disclosure includes the following steps. The panel includes a controller and a pixel circuit. A built-in temperature detector of the controller senses temperature of the panel to generate a sensing temperature value. The controller generates an overdriving voltage, according to the sensing temperature value and lookup information. The controller outputs the overdriving voltage to the pixel circuit.

Embodiments of the disclosure further provide an operating method. The operating method is adapted to a panel. The panel includes a controller, a plurality of touch sensors and a pixel circuit. The operating method includes the following steps. The controller obtains raw data according to touch sensing signals output from the plurality of touch sensors during a temperature sensing period. The controller calculates a sensing temperature value, according to the raw data and first lookup information. The controller generates an overdriving voltage, according to the sensing temperature value and second lookup information. The controller outputs the overdriving voltage to the pixel circuit.

Based on the above, in the operating method of the embodiment of the disclosure, by utilizing the controller to generate the sensing temperature, the controller generates the overdriving voltage accordingly without an external temperature detector. As such, the panel is capable of reducing the cost, and may be utilized in the narrow frame application.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

FIG. 5 is a schematic diagram of operations of the panel according to the embodiment of FIGS. 3 and 4 of the disclosure.

FIG. 8 is a schematic diagram of operations of the panel according to the embodiment of FIGS. 3 and 7 of the disclosure.

DESCRIPTION OF THE EMBODIMENTS

Figure 1:
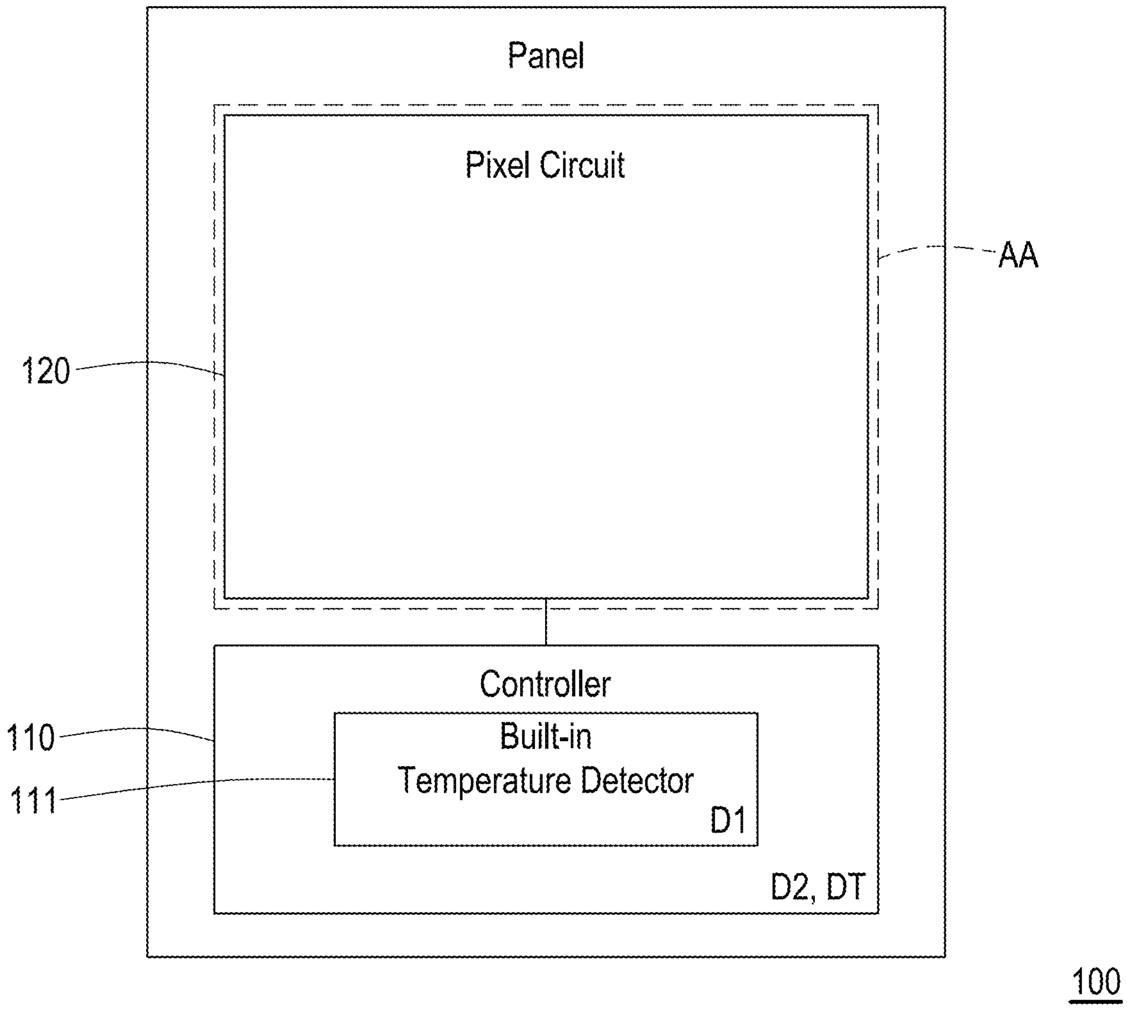
FIG. 1 is a circuit block diagram of a panel according to an embodiment of the disclosure.

Some embodiments of the disclosure will be described in detail below with reference to the accompanying drawings.

The reference numerals cited in the following description will be regarded as the same or similar elements when the same reference numeral appears in different drawings. These embodiments are only part of the disclosure and do not disclose all possible implementations of the disclosure. Rather, these embodiments are merely examples within the scope of the disclosure.

FIG. 1 is a circuit block diagram of a panel according to an embodiment of the disclosure. Referring to FIG. 1, a panel 100 may be a display panel. The panel 100 may implement multiple functions, such as a displaying function and a temperature detecting function. Alternatively, the panel 100 may be a touch display panel, and may further implement a touching function.

In the embodiment of FIG. 1, the panel 100 includes a controller 110 and a pixel circuit 120. The pixel circuit 120 is coupled to the controller 110. The pixel circuit 120 is arranged at an active area AA of the panel 100. The pixel circuit 120 includes multiple pixel units (not shown in FIG. 1). These pixel units are arranged in an array, and have the same circuit architecture. The pixel units may be, for example, a liquid crystal display (LCD), a light-emitting diode (LED), an organic light-emitting diode (OLED), or other displaying elements that provide the displaying function.

In this embodiment, the controller 110 includes a built-in temperature detector 111. The built-in temperature detector 111 may be implemented by a resistive temperature detector, and is integrated with the controller 110.

In this embodiment, the controller 110 may be implemented by an integrated circuit (IC). In the application of the display panel 100, the controller 110 may be implemented by a display driver IC (DDIC). In the application of the touch display panel 100, the controller 110 may be implemented by a touch with display driver integrated circuit (TDDI).

In this embodiment, the controller 110 may be, for example, a microcontroller unit (MCU), a signal converter, a field programmable gate array (FPGA), a central processing unit (CPU), other programmable general purpose or special-purpose microprocessor, a digital signal processor (DSP), a programmable controller, an application specific integrated circuits (ASIC), a programmable logic device (PLD), other similar devices, or a combination of the foregoing, which may load and execute computer program-related firmware or software to implement drive, control, access, and various calculation functions.

Figure 2:
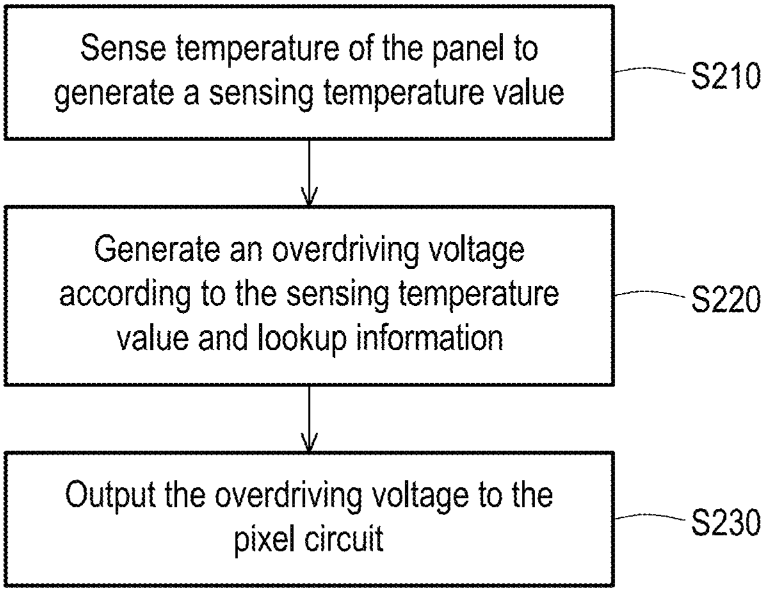
FIG. 2 is a flow chart of an operating method adapted to a panel according to an embodiment of the disclosure.

FIG. 2 is a flow chart of an operating method adapted to a panel according to an embodiment of the disclosure. Referring to FIGS. 1 and 2, the panel 100 may execute the following steps S210 to S230. The order of these steps S210 to S230 is only for illustration and not limited thereto.

In step S210, the built-in temperature detector 111 senses temperature of the panel 100 to generate a sensing temperature value D1. The sensing temperature value D1 indicates the current temperature of the active area AA, which further indicates the current temperature of the whole panel 100.

In step S220, the controller 110 generates an overdriving voltage D2 according to the sensing temperature value D1 and lookup information DT. In this embodiment, the lookup information DT indicates a correspondence between voltages and the temperature of the panel 100. The foresaid voltages may be, for example, voltage values for overdriving the pixel circuit 120.

Alternatively stated, based on the correspondence (e.g., the lookup information DT), the controller 110 performs the calculation on the sensing temperature value D1 to generate the corresponding voltage D2 for overdriving the pixel circuit 120.

In step S230, the controller 110 outputs the overdriving voltage D2 to the pixel circuit 120. As such, the controller 110 overdrives the pixel circuit 120 according to the overdriving voltage D2.

With the overdriving, the response time when grey levels of the pixel circuit 120 are in transition may be reduced. The controller 110 eliminates the displaying problems of the pixel circuit 120, such as, for example, mura and burn in, accordingly.

It is worth mentioning that, since the built-in temperature detector 111 is integrated with the controller 110, rather than being external to the panel 100, the controller 110 is capable of directly obtaining the sensing temperature value D1. Besides, based on the lookup information DT, the controller 110 is capable of calculating the overdriving voltage D2 corresponding to the current temperature of the panel 100. As such, the panel 100 is capable of improving the displaying function with low costs, and may be utilized in the narrow frame application.

Figure 3:
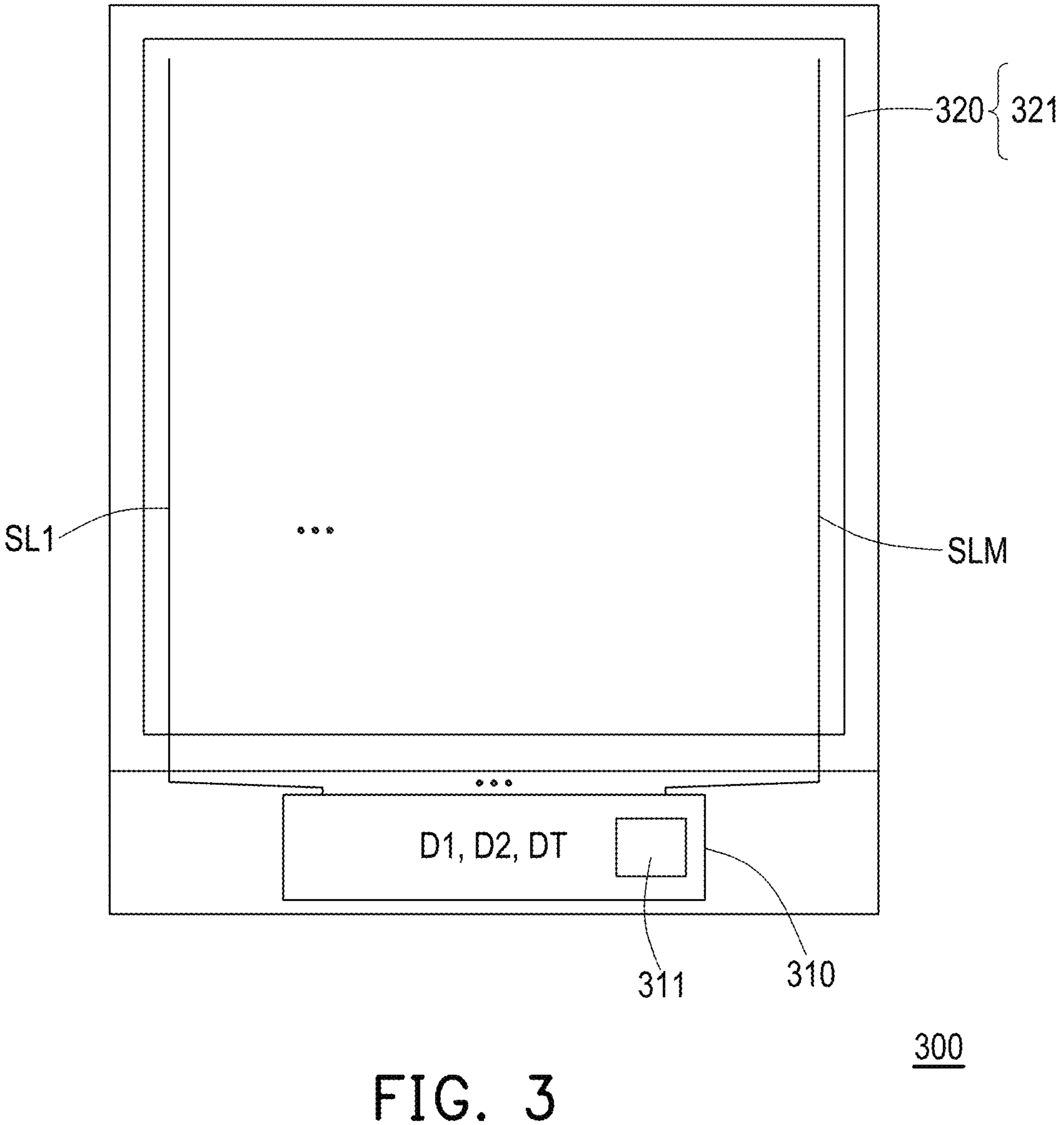
FIG. 3 is a circuit block diagram of a panel according to another embodiment of the disclosure.

FIG. 3 is a circuit block diagram of a panel according to another embodiment of the disclosure. Referring to FIG. 3, a panel 300 includes a controller 310 and a pixel circuit 320. The controller 310 includes a built-in temperature detector 311. The controller 310, the pixel circuit 320 and the built-in temperature detector 311 may be described with reference to and by analogy with the panel 100.

In the embodiment of FIG. 3, the panel 300 further includes multiple data lines SL1 to SLM, wherein M is an integer. The controller 310 is coupled to the pixel circuit 320 through the data lines SL1 to SLM. The controller 310 is configured to output the overdriving voltage D2 through the data lines SL1 to SLM to multiple pixel units 321 of the pixel circuit 320.

Figure 4:
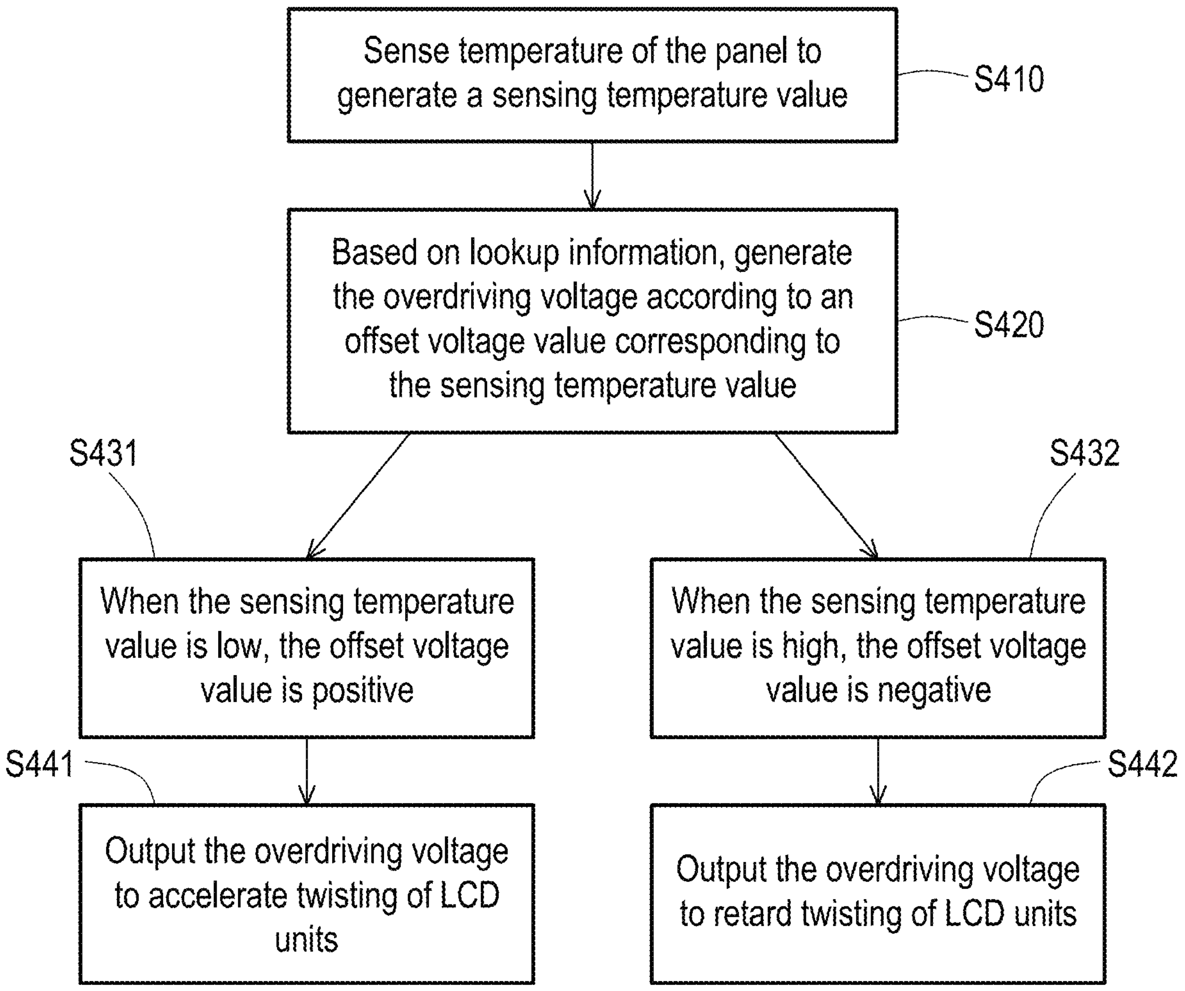
FIG. 4 is a flow chart of an operating method according to the embodiment of FIG. 3.

FIG. 4 is a flow chart of an operating method according to the embodiment of FIG. 3. Referring to FIGS. 3 and 4, the panel 300 may execute the following steps S410 to S420, S431 to S432 and S441 to S442, to illustrate the detail of the steps S210 to S230 in FIG. 2. The order of these steps S410 to S442 is only for illustration and not limited thereto.

In the embodiment of FIGS. 3 and 4, the panel 300 is implemented by a display panel. The controller 310 is implemented by the DDIC. The pixel circuit 320 is applied with the LCD.

In step S410, the built-in temperature detector 311 senses temperature of the panel 300 to generate a sensing temperature value D1.

In step S420, based on the lookup information DT, the controller 310 generates the overdriving voltage D2 according to an offset voltage value corresponding to the sensing temperature value D1. The lookup information DT may be stored in the controller 310.

In this embodiment, the lookup information DT includes a correlation between offset voltage values of the pixel circuit 320 and temperature. The lookup information DT may be, for example, represented as a lookup table, an equation, a diagram or other transforming information between the offset voltage values and the temperature.

For example, referring to FIG. 5, FIG. 5 is a schematic diagram of operations of the panel according to the embodiment of FIGS. 3 and 4 of the disclosure, to illustrate an example of the lookup information DT when the pixel circuit 320 is applied with the LCD.

In the embodiment of FIG. 5, since the pixel circuit 320 is applied with the LCD, the pixel circuit 320 includes a plurality of pixel units 321 that are implemented by LCD units, hereinafter, the LCD units 321. The LCD units 321 are configured to control the twisting of the liquid crystal (LC) thereof according to the applied voltage (e.g., the overdriving voltage D2). As such, in the lookup information DT shown in FIG. 5, the offset voltage values of the pixel circuit 320 and the temperature have a negative correlation.

In this embodiment, the offset voltage values of the pixel circuit 320 are referred to voltage differences compared with a reference overdriving voltage. In the block 511, the reference overdriving voltage may be, for example, the voltage utilized to overdrive the pixel circuit 320 when the panel 300 is at a reference temperature (e.g., a room temperature).

Specifically, in the step S420, the controller 310 calculates the sensing temperature value D1 and the lookup information DT to generate an offset voltage value. That is, based on the lookup information DT shown in FIG. 5, the controller 310 lookups the offset voltage value corresponding to the sensing temperature value D1.

Alternatively, based on the lookup information DT shown in FIG. 5, the controller 310 performs a linear interpolation on the sensing temperature value D1, a room temperature value (i.e., 25° C.) and an offset voltage value (i.e., 0V) corresponding to the room temperature, to generate the offset voltage value corresponding to the sensing temperature value D1.

Continued in the step S420, the controller 310 compensates the reference overdriving voltage corresponding to the reference temperature value according to the above offset voltage value to generate the overdriving voltage D2. Based on the lookup information DT shown in FIG. 5, in the block 511, the reference overdriving voltage has the offset voltage value indicated as 0V. The reference temperature value is the room temperature value (i.e., 25° C.).

Alternatively stated, based on the lookup information DT, the controller 310 obtains the offset voltage value corresponding to the current temperature of the panel 300 (i.e., the sensing temperature value D1). Based on the lookup information DT, the controller 310 further obtains the default overdriving voltage (i.e., the reference overdriving voltage), and offsets such default overdriving voltage by the offset voltage value to generate the overdriving voltage D2.

When the current temperature of the panel 300 is lower than the room temperature, the LC of the LCD units 321 slows down the twisting, such that the color shift problem happens. In order to solve the foresaid problem, the controller 310 execute the following steps S431 and S441 to overdrive the LCD units 321.

In step S431, compared with the room temperature value (i.e., 25° C.), when the sensing temperature value D1 is low, based on the lookup information DT shown in FIG. 5, the offset voltage value is positive. In step S441, the controller 310 outputs the overdriving voltage D2 to the pixel circuit 320, to accelerate the twisting of the LCD units 321. As such, the displayed color of the panel 300 is improved accordingly.

Figure 6A:
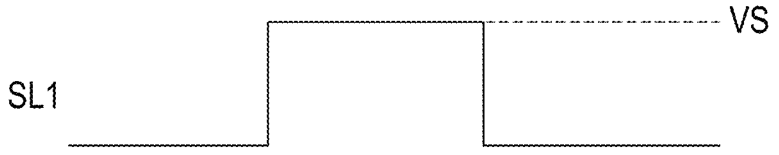
FIGS. 6A to 6C are schematic diagrams of operations of the panel according to the embodiment of FIG. 3 of the disclosure.
Figure 6B:
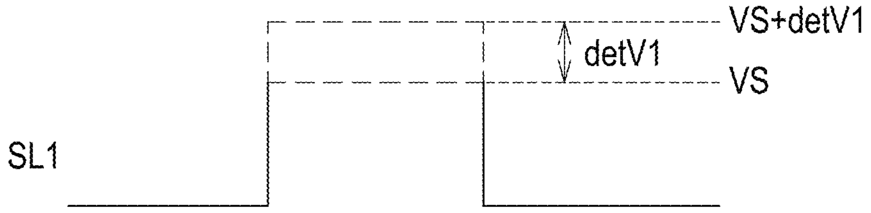
Figure 6C:
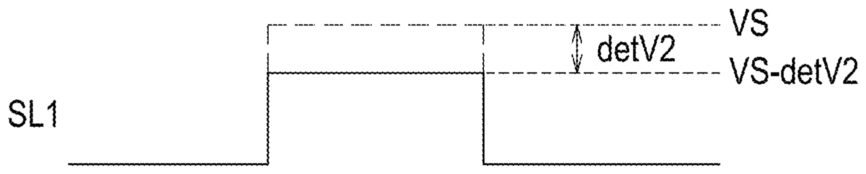

For example, referring to FIGS. 6A to 6C, FIGS. 6A to 6C are schematic diagrams of operations of the panel according to the embodiment of FIG. 3 of the disclosure. In FIGS. 6A to 6C, the horizontal axis represents operating time of the panel 300. The vertical axis represents voltage applied to the pixel circuit 320 through the data lines SL1 to SLM, wherein one data line SL1 is illustrated as an example.

As shown in FIG. 6A, when the sensing temperature value D1 is equal to the room temperature value (i.e., 25° C.), based on the lookup information DT shown in FIG. 5, the offset voltage value is 0. The controller 310 generates the overdriving voltage D2 (i.e., the reference overdriving voltage) with the voltage value VS and the corresponding offset voltage value (i.e., 0V). The overdriving voltage D2 may be a pulse signal. The controller 310 outputs such overdriving voltage D2 to the LCD units 321 through the data lines SL1 to SLM, and overdrives the LCD units 321 accordingly.

In the situation of the steps S431 and S441, based on the lookup information DT shown in FIG. 5, the offset voltage value is positive, and may be, for example, "+detV1". As shown in FIG. 6B, the controller 310 generates the overdriving voltage D2 with the voltage value VS and the corresponding offset voltage value "+detV1". Since such overdriving voltage D2 has a voltage value higher than the voltage value of the reference overdriving voltage shown in FIG. 6A, the twisting of the LCD units 321 is capable of being accelerated, so as to improve the displayed color.

On the other hand, when the current temperature of the panel 300 is higher than the room temperature, the LC of the LCD units 321 speeds up the twisting, such that the color shift problem happens. In order to solve the foresaid problem, the controller 310 execute the following steps S432 and S442 to overdrive the LCD units 321.

In step S432, compared with the room temperature value (i.e., 25° C.), when the sensing temperature value D1 is high, based on the lookup information DT shown in FIG. 5, the offset voltage value is negative. In step S442, the controller 310 outputs the overdriving voltage D2 to the pixel circuit 320, to retard the twisting of the LCD units 321. As such, the displayed color of the panel 300 is improved accordingly.

In the situation of the steps S432 and S442, based on the lookup information DT shown in FIG. 5, the offset voltage value may be, for example, "−2detV1". As shown in FIG. 6C, the controller 310 generates the overdriving voltage D2 with the voltage value VS and the corresponding offset voltage value "−detV2". The offset voltage value "−detV2" may be the voltage value "−2detV1" in FIG. 5. Since such overdriving voltage D2 has a voltage value lower than the voltage value of the reference overdriving voltage shown in FIG. 6A, the twisting of the LCD units 321 is capable of being retarded, so as to improve the displayed color.

Figure 7:
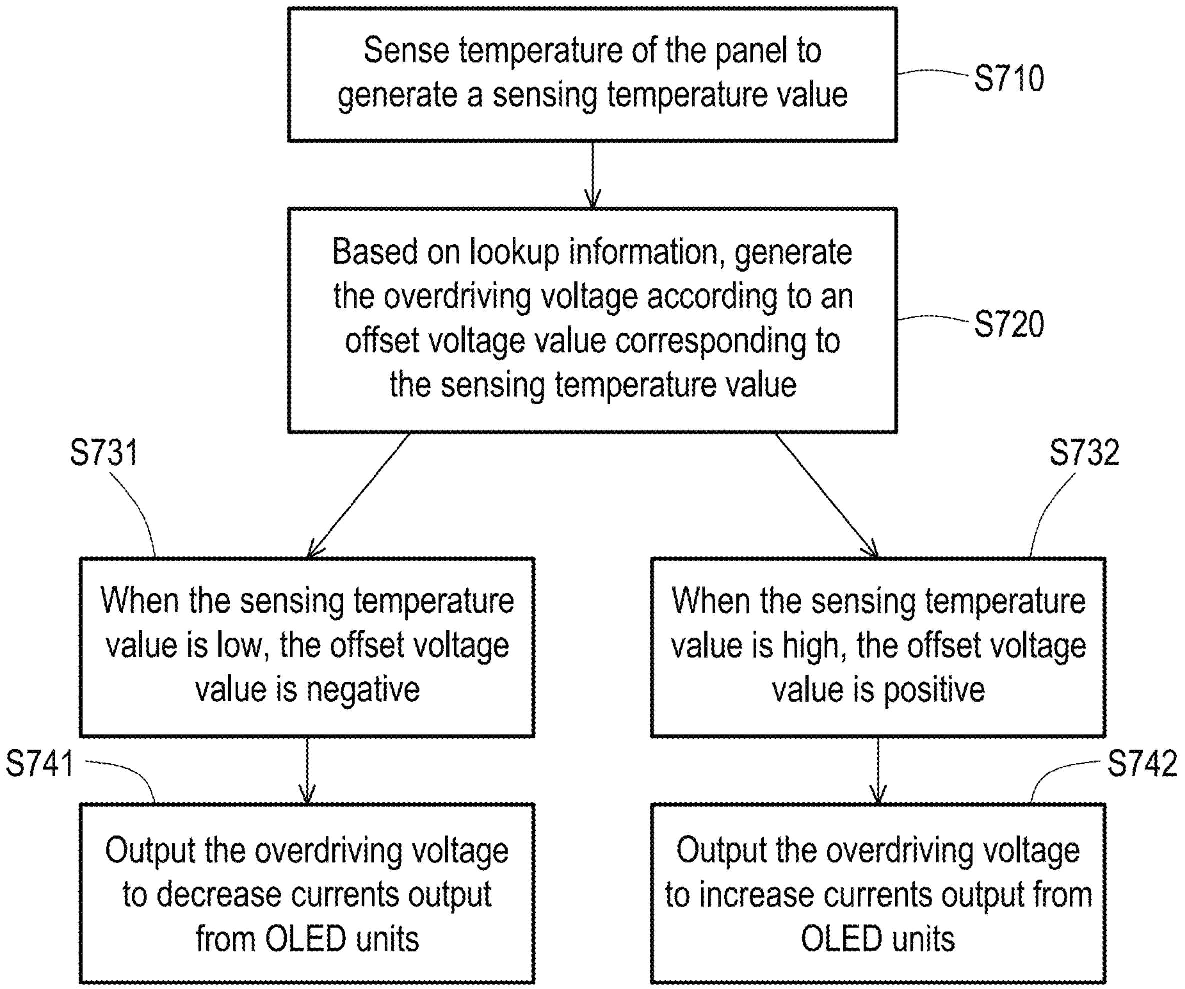
FIG. 7 is a flow chart of an operating method according to the embodiment of FIG. 3.

FIG. 7 is a flow chart of an operating method according to the embodiment of FIG. 3. Referring to FIGS. 3 and 7, the panel 300 may execute the following steps S710 to S720, S731 to S732 and S741 to S742, to illustrate the detail of the steps S210 to S230 in FIG. 2.

Compared with the embodiment of FIGS. 3 and 4, in the embodiment of FIGS. 3 and 7, the pixel circuit 320 is applied with the LED, and in particular, is applied with the OLED. The steps S710 to S720 may be described with reference to and by analogy with the steps S410 to S420 in FIG. 4.

It should be noted that, in the step S720, the lookup information DT may be for example, represented as a lookup table as shown in FIG. 8. Referring to FIG. 8, FIG. 8 is a schematic diagram of operations of the panel according to the embodiment of FIGS. 3 and 7 of the disclosure, to illustrate an example of the lookup information DT when the pixel circuit 320 is applied with the LED, and in particular, the OLED.

In the embodiment of FIG. 8, since the pixel circuit 320 is applied with the LED, the pixel circuit 320 includes a plurality of pixel units 321 that are implemented by LED units, and in particular, are implemented by the OLED units, hereinafter, the OLED units 321. The OLED units 321 are configured to control the output currents for driving the OLEDs according to the applied voltage (e.g., the overdriving voltage D2). As such, in the lookup information DT shown in FIG. 8, the offset voltage values of the pixel circuit 320 and the temperature have a positive correlation.

When the current temperature of the panel 300 is lower than the room temperature, the currents output from the driving transistor of the OLED units 321 are increased, such that the color shift problem happens. In order to solve the foresaid problem, the controller 310 execute the following steps S731 and S741 to overdrive the OLED units 321.

In step S731, compared with the room temperature value (i.e., 25° C.), when the sensing temperature value D1 is low, based on the lookup information DT shown in FIG. 8, the offset voltage value is negative. In step S741, the controller 310 outputs the overdriving voltage D2 to the pixel circuit 320, to decrease the currents output from the OLED units 321. As such, the displayed color of the panel 300 is improved accordingly.

In the situation of the steps S731 and S741, based on the lookup information DT shown in FIG. 8, the offset voltage value is negative, and may be, for example, "−2detV1". As shown in FIG. 6C, the controller 310 generates the overdriving voltage D2 with the voltage value VS and the corresponding offset voltage value "−detV2". The offset voltage value "−detV2" may be the voltage value "−2detV1" in FIG. 8. Since such overdriving voltage D2 has a voltage value lower than the voltage value of the reference overdriving voltage corresponding to the room temperature, the currents output from the OLED units 321 is capable of being decreased, so as to improve the displayed color.

On the other hand, when the current temperature of the panel 300 is higher than the room temperature, the currents output from the driving transistor of the OLED units 321 are decreased, such that the color shift problem happens. In order to solve the foresaid problem, the controller 310 execute the following steps S732 and S742 to overdrive the OLED units 321.

In step S732, compared with the room temperature value (i.e., 25° C.), when the sensing temperature value D1 is high, based on the lookup information DT shown in FIG. 8, the offset voltage value is positive. In step S742, the controller 310 outputs the overdriving voltage D2 to the pixel circuit 320, to increase the currents output from the OLED units 321. As such, the displayed color of the panel 300 is improved accordingly.

In the situation of the steps S732 and S742, based on the lookup information DT shown in FIG. 8, the offset voltage value is positive, and may be, for example, "+detV1". As shown in FIG. 6B, the controller 310 generates the overdriving voltage D2 with the voltage value VS and the corresponding offset voltage value "+detV1". Since such overdriving voltage D2 has a voltage value higher than the voltage value of the reference overdriving voltage corresponding to the room temperature, the currents output from the OLED units 321 is capable of being increased, so as to improve the displayed color.

Figure 9:
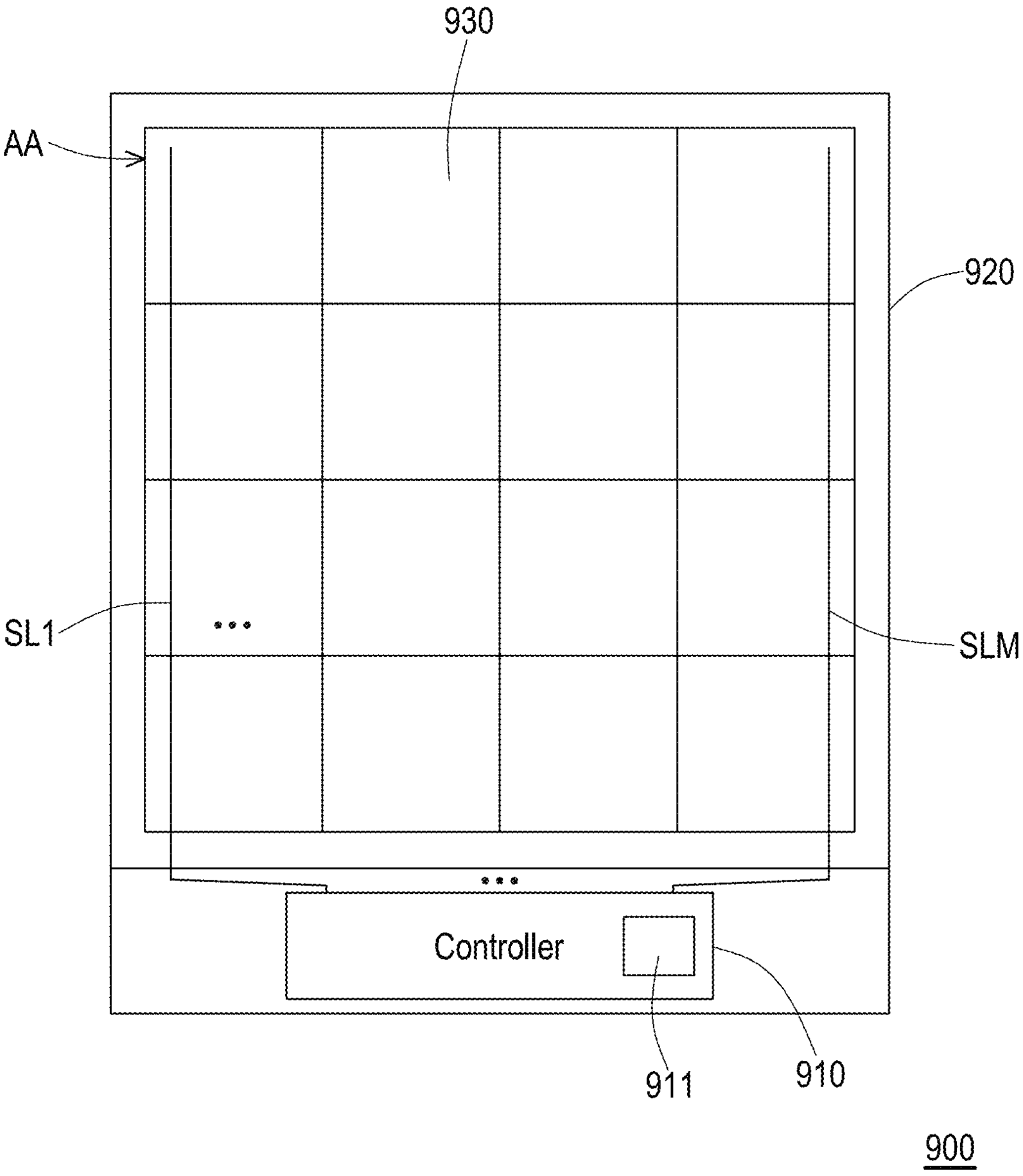
FIG. 9 is a circuit block diagram of a panel according to another embodiment of the disclosure.

FIG. 9 is a circuit block diagram of a panel according to another embodiment of the disclosure. Referring to FIG. 9, a panel 900 includes a controller 910, a pixel circuit 920 and multiple data lines SL1 to SLM, wherein M is an integer. The controller 910 includes a built-in temperature detector 911. The controller 910, the pixel circuit 920, the built-in temperature detector 911 and the data lines SL1 to SLM may be described with reference to and by analogy with the panel 300.

In the embodiment of FIG. 9, the panel 900 is implemented by a touch display panel. The controller 910 is implemented by the TDDI. The controller 910 may execute the method illustrated in FIG. 4, to overdrive the pixel circuit 920 based on the temperature of the panel 900. The pixel circuit 920 is applied with the LCD.

In this embodiment, the panel 900 further includes multiple touch sensors 930. The touch sensors 930 are arranged at the active area AA. The touch sensors 930 are arranged in an array, and have the same circuit architecture. The touch sensors 930 are coupled to the controller 910. The touch sensors 930 may be, for example, applied with an indium tin oxide (ITO) material or other transparent conductive materials.

Figure 10:
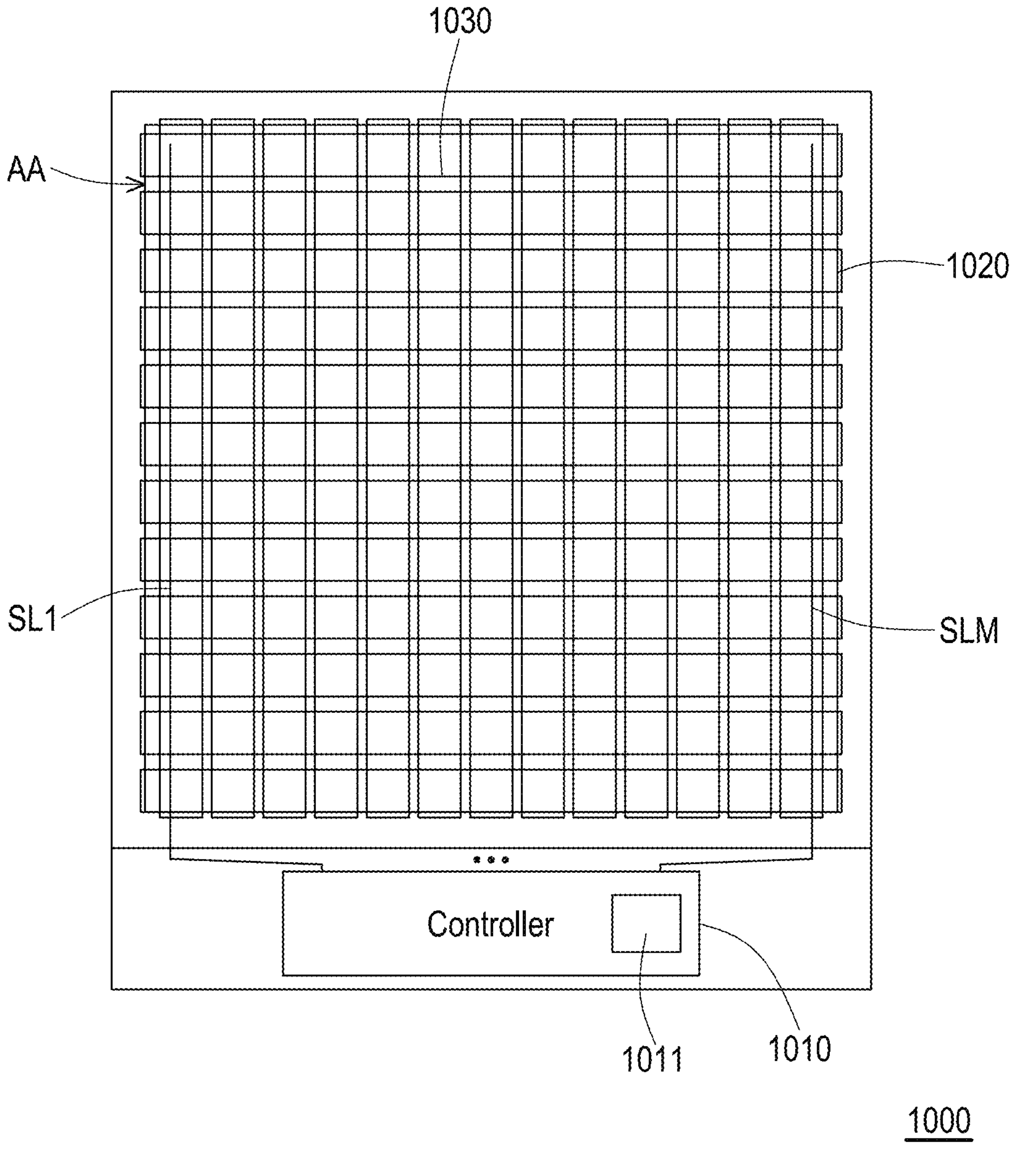
FIG. 10 is a circuit block diagram of a panel according to another embodiment of the disclosure.

FIG. 10 is a circuit block diagram of a panel according to another embodiment of the disclosure. Referring to FIG. 10, a panel 1000 includes a controller 1010, a pixel circuit 1020, multiple data lines SL1 to SLM, and multiple touch sensors 1030, wherein M is an integer. The controller 1010 includes a built-in temperature detector 1011. The controller 1010, the pixel circuit 1020, the built-in temperature detector 1011, the data lines SL1 to SLM and the touch sensors 1030 may be described with reference to and by analogy with the panel 900.

In the embodiment of FIG. 10, the panel 1000 is implemented by a touch display panel. The controller 1010 is implemented by the TDDI. The controller 1010 may execute the method illustrated in FIG. 7, to overdrive the pixel circuit 1020 based on the temperature of the panel 1000. The pixel circuit 1020 is applied with the OLED. The touch sensors 1030 may be, for example, applied with a metal material (e.g., metal mesh structure).

Figure 11:
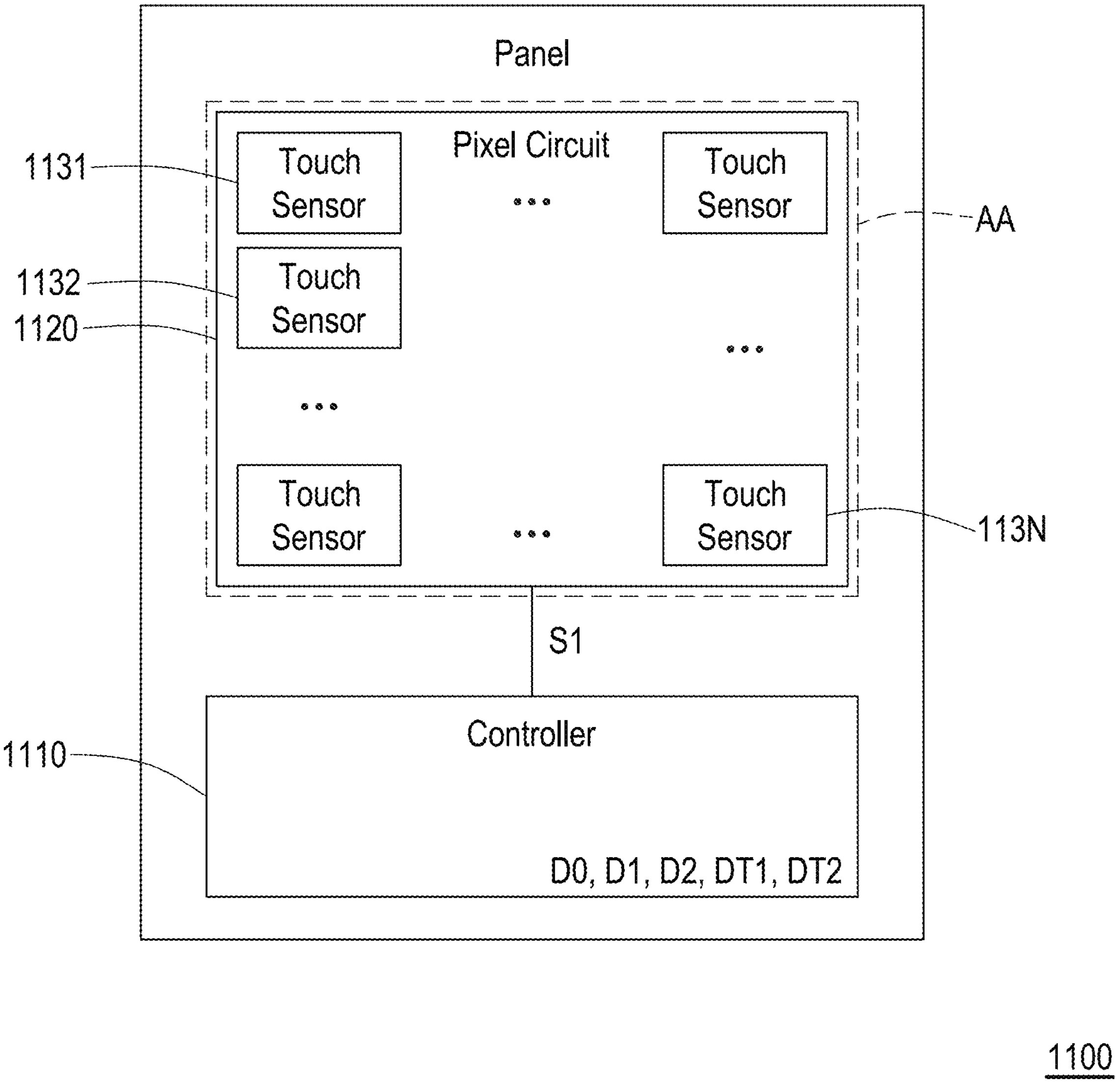
FIG. 11 is a circuit block diagram of a panel according to an embodiment of the disclosure.

FIG. 11 is a circuit block diagram of a panel according to an embodiment of the disclosure. Referring to FIG. 11, a panel 1100 may be a touch display panel. The panel 1100 may implement multiple functions, such as a displaying function, a temperature detecting function and a touching function.

In the embodiment of FIG. 11, the panel 1100 includes a controller 1110, a pixel circuit 1120, and a plurality of touch sensors 1131 to 113N, wherein N is an integer. The pixel circuit 1120 and the touch sensors 1131 to 113N are coupled to the controller 1110.

In this embodiment, the pixel circuit 1120 is arranged at an active area AA of the panel 1100. The pixel circuit 1020 includes multiple pixel units (not shown in FIG. 11). These pixel units are arranged in an array, and have the same circuit architecture. The pixel units may be, for example, a LCD, a LED, an OLED, or other displaying elements that provide the displaying function.

In this embodiment, the touch sensors 1131 to 113N are arranged at the active area AA. The touch sensors 1131 to 113N are arranged in an array, and have the same circuit architecture. The touch sensors 930 may be, for example, applied with an ITO material or other transparent conductive materials, or applied with a metal material (e.g., metal mesh structure).

In this embodiment, the controller 1110 may include a MCU and a DDIC. Alternatively, the controller 1110 may be implemented by a TDDI. In this embodiment, the controller 1110 may be, for example, a MCU, a FPGA, a CPU, other programmable general purpose or special-purpose microprocessor, a DSP, a programmable controller, an ASIC, a PLD, other similar devices, or a combination of the foregoing, which may load and execute computer program-related firmware or software to implement drive, control, access, and various calculation functions.

Figure 12:
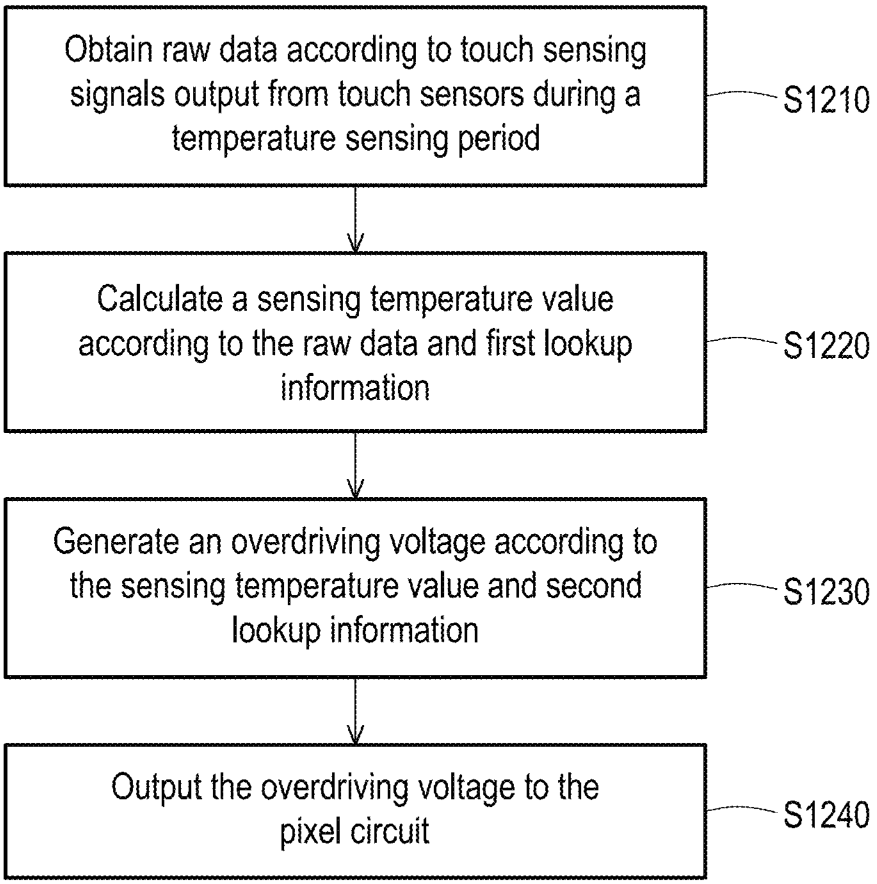
FIG. 12 is a flow chart of an operating method adapted to a panel according to an embodiment of the disclosure.

FIG. 12 is a flow chart of an operating method adapted to a panel according to an embodiment of the disclosure. Referring to FIGS. 11 and 12, the panel 1100 may execute the following steps S1210 to S1240. The order of these steps S1210 to S1240 is only for illustration and not limited thereto.

In step S1210, the controller 1110 obtains raw data D0 according to touch sensing signals S1 output from the touch sensors 1131 to 113N during a temperature sensing period. The temperature sensing period is a period without driving the pixel circuit 1120. For example, the temperature sensing period may be a touch sensing period, or a porch period.

In this embodiment, the touch sensing signals S1 are signals sensed by the touch sensors 1131 to 113N without a touch event. The raw data D0 is digital data corresponding to the touch sensing signals S1. That is, the raw data D0 indicates baseline values of the touch sensors 1131 to 113N at the current temperature of the panel 1100.

Alternatively stated, during the period without the touch event and the driven pixel circuit (i.e., the temperature sensing period), the controller 1110 receives the touch sensing signals S1 output from the touch sensors 1131 to 113N. Then, the controller 1110 converts the touch sensing signals S1 into the raw data D0.

In step S1220, during the temperature sensing period, the controller 1110 calculates a sensing temperature value D1, according to the raw data D0 and first lookup information DT1. The sensing temperature value D1 indicates the current temperature of the active area AA, which further indicates the current temperature of the whole panel 1100. In some embodiments, the sensing temperature value D1 indicates the current temperature at one region of the active area AA where the touch sensors 1131 to 113N are located.

In this embodiment, the first lookup information DT1 indicates a correspondence between the baseline value without the touch event and temperature of the panel 1100.

Alternatively stated, based on the correspondence (e.g., the first lookup information DT1), the controller 1110 performs the calculation on the raw data D0 to generate the sensing temperature value D1.

In step S1230, during the temperature sensing period, the controller 1110 generates an overdriving voltage D2 according to the sensing temperature value D1 and second lookup information DT2. In this embodiment, the second lookup information DT2 indicates a correspondence between voltages and the temperature of the panel 1100. The foresaid voltages may be, for example, voltage values for overdriving the pixel circuit 1120.

Alternatively stated, based on the correspondence (e.g., the second lookup information DT2), the controller 1110 performs the calculation on the sensing temperature value D1 to generate the corresponding voltage D2 for overdriving the pixel circuit 1120.

In step S1240, during the temperature sensing period, the controller 1110 outputs the overdriving voltage D2 to the pixel circuit 1120. As such, during a displaying period, the controller 1110 overdrives the pixel circuit 1120 according to the overdriving voltage D2, to reduce the response time when grey levels of the pixel circuit 1120 are in transition. The displaying period is a period when the pixel circuit 1120 is driven.

With the overdriving, the response time when grey levels of the pixel circuit 1120 are in transition may be reduced. The controller 1100 eliminates the displaying problems of the pixel circuit 1120, such as, for example, mura and burn in, accordingly.

It is worth mentioning that, since the raw data D0 indicates the baseline values of the touch sensors 1131 to 113N at the current temperature, based on the first lookup information DT1, the controller 1110 is capable of obtaining the sensing temperature value D1 without a temperature detector. Besides, based on the second lookup information DT2, the controller 1110 is capable of calculating the overdriving voltage D2 corresponding to the current temperature of the panel 1100. As such, the panel 1100 is capable of improving the displaying function with low costs, and may be utilized in the narrow frame application.

Figure 13A:
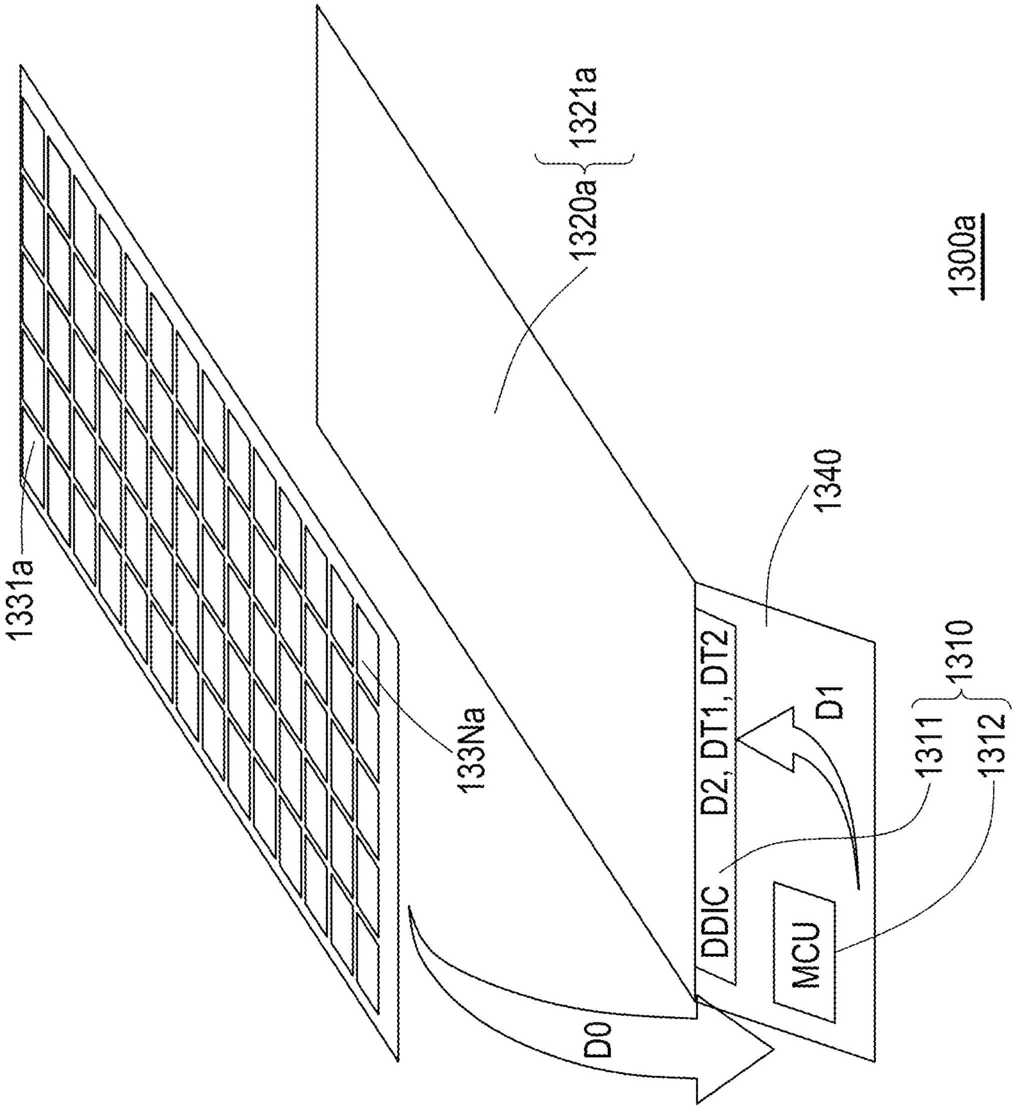
FIG. 13A is a circuit block diagram of a panel according to another embodiment of the disclosure.

FIG. 13A is a circuit block diagram of a panel according to another embodiment of the disclosure. Referring to FIG. 13A, a panel 1300*a* includes a controller 1310, a pixel circuit 1320*a*, and multiple touch sensors 1331*a* to 133Na, wherein Na is an integer. The controller 1310, the pixel circuit 1320*a* and the touch sensors 1331*a* to 133Na may be described with reference to and by analogy with the panel 1100.

In the embodiment of FIG. 13A, the panel 1300*a* is implemented by an LCD touch display panel. The pixel circuit 1320*a* is applied with the LCD. The pixel circuit 1320*a* includes multiple pixel units 1321*a* that are implemented by LCD units. The touch sensors 1331*a* to 133Na may be, for example, applied with an ITO material or other transparent conductive materials.

In this embodiment, the controller 1310 includes a DDIC 1311 and a MCU 1312. The MCU 1312 is coupled to the touch sensors 1331*a* to 133Na. The MCU 1312 is further coupled to the DDIC 1311. The DDIC 1311 is coupled to the pixel circuit 1320*a*. The MCU 1312 and the DDIC 1311 are arranged in the same circuit board 1340. The circuit board may be, for example, implemented by a flexure circuit board (FPC).

Figure 13B:
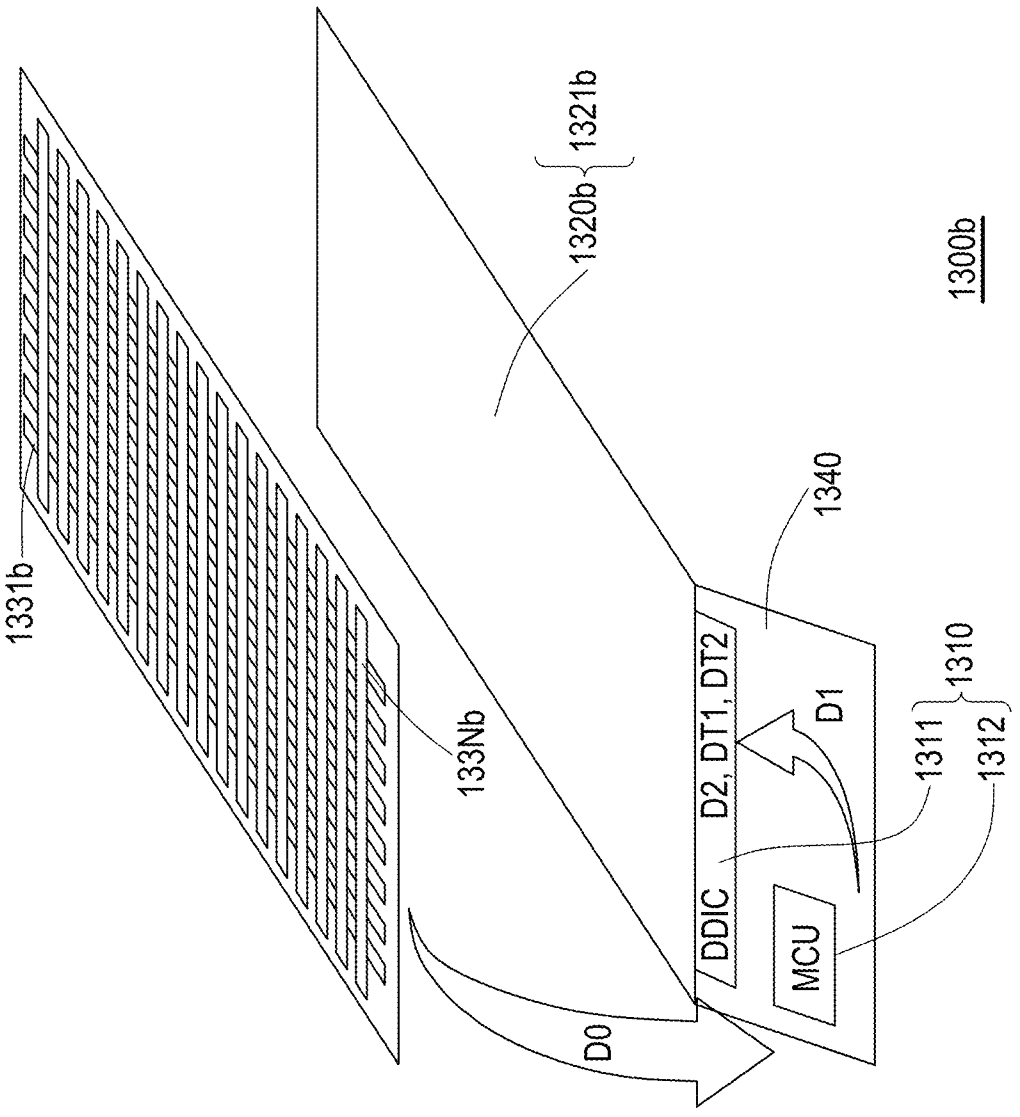
FIG. 13B is a circuit block diagram of a panel according to another embodiment of the disclosure.

FIG. 13B is a circuit block diagram of a panel according to another embodiment of the disclosure Compared with the embodiment of FIG. 13A, in the FIG. 13B, a panel 1300*b* is implemented by a LED touch display panel, and in particular, is implemented by an OLED touch display panel. The pixel circuit 1320*b* is applied with the LED, and in particular, is applied with the OLED. The pixel circuit 1320*b* includes multiple pixel units 1321*b* that are implemented by LED units, and in particular, OLED units. The touch sensors 1331*b* to 133Nb may be, for example, applied with a metal mesh structure or other conductive structures.

Figure 14:
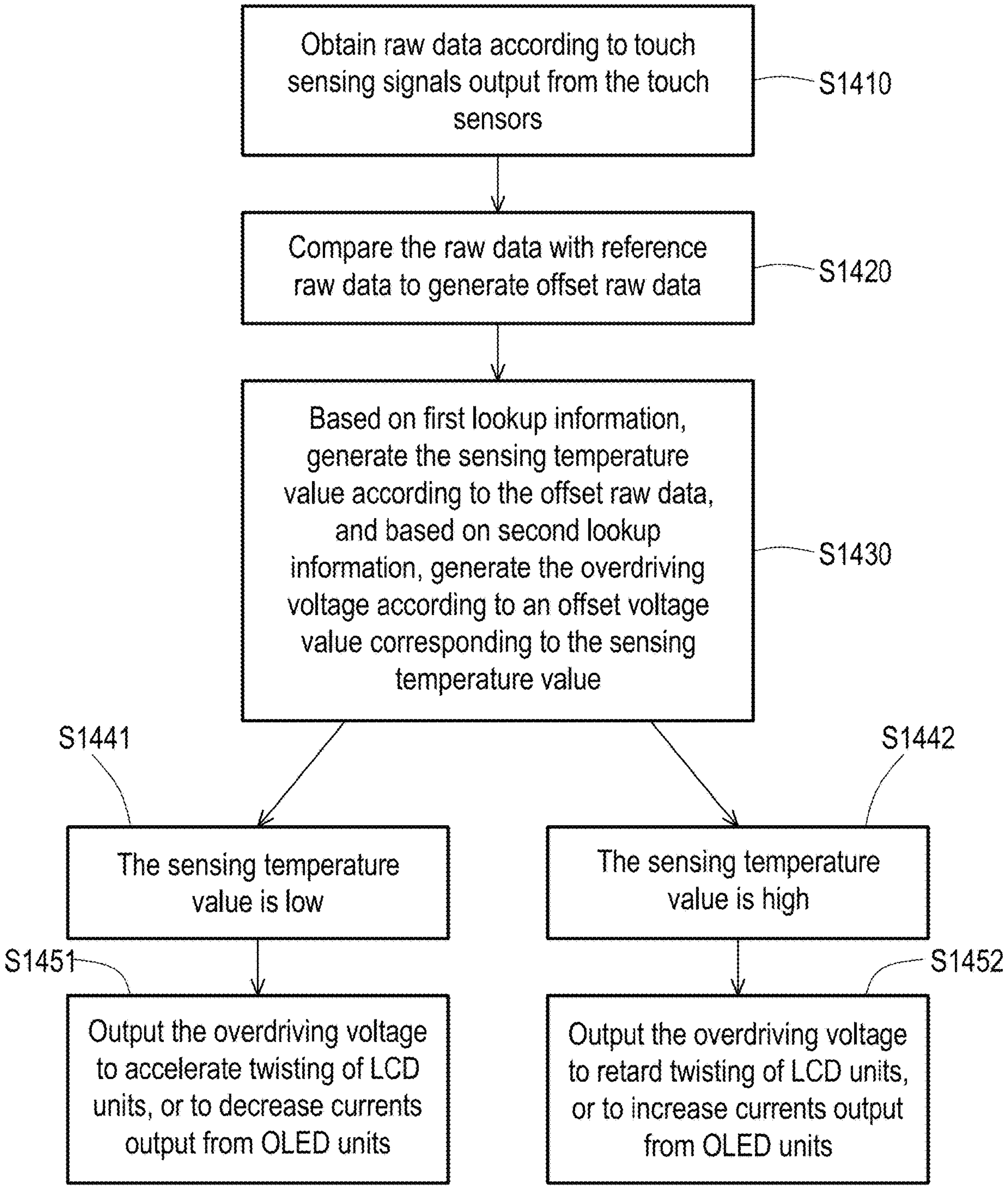
FIG. 14 is a flow chart of an operating method of the panel according to the embodiment of FIGS. 13A and 13B.

FIG. 14 is a flow chart of an operating method of the panel according to the embodiment of FIGS. 13A and 13B. Referring to FIGS. FIGS. 13A, 13B and 14, the panels 1300*a* and 1300*b* may respectively execute the following steps S1410 to S1430, S1431 to S1432, S1441 to S1442 and S1451 to S1452, to illustrate the detail of the steps S1210 to S1240 in FIG. 12. The order of these steps S1410 to S1452 is only for illustration and not limited thereto.

In step S1410, during each frame, the controller 1310, through the MCU 1312, obtains raw data D0 according to touch sensing signals (e.g., the touch sensing signals S1 shown in FIG. 11) output from the touch sensors 1331*a* to 133Na or 1331*b* to 133Nb. One of the raw data D0 is obtained according to one of the touch sensing signals, and corresponds to one of the touch sensors 1331*a* to 133Na or 1331*b* to 133Nb.

In this embodiment, each frame includes one temperature sensing period. Each frame further includes at least one porch period and one displaying period. These periods during the same frame are not overlapped with each other, and have respective operations.

Specifically, in this embodiment, the temperature sensing period is a period when the touch sensors 1331*a* to 133Na or 1331*b* to 133Nb perform a touch sensing operation. That is, during the temperature sensing period, the controller 1310, through the MCU 1312, drives the corresponding touch sensors 1331*a* to 133Na and 1331*b* to 133Nb to implement at least one of the touching function and the temperature detecting function. The temperature sensing period may be a touch sensing period.

In addition, during the porch period, the controller 1310, through the MCU 1312 and/or the DDIC 1311, outputs at least one synchronous clock signal. During the displaying period, the controller 1310, through the DDIC 1311, drives the corresponding pixel circuit 1320*a* and 1320*b* to implement the displaying function.

Alternatively, in another embodiment, the temperature sensing period is a period when the corresponding touch sensors 1331*a* to 133Na and 1331*b* to 133Nb do not perform the touch sensing operation and the displaying operation. That is, during the temperature sensing period, the MCU 1312 does not drive the corresponding touch sensors 1331*a* to 133Na and 1331*b* to 133Nb to implement the touching function. In addition, the DDIC 1311 does not drive the corresponding pixel circuit 1320*a* and 1320*b* to implement the displaying function. The temperature sensing period may be a touch sensing period.

In step S1420, during the temperature sensing period, the controller 1310, through the MCU 1312, compares the raw data D0 with reference raw data to generate offset raw data. The reference raw data indicates baseline values of the corresponding touch sensors 1331*a* to 133Na and 1331*b* to 133Nb at the room temperature of the panel 1300. Alternatively stated, during the temperature sensing period, the MCU 1312 obtains a difference (i.e., the offset raw data) between the raw data D0 and the reference raw data.

In step S1430, during the temperature sensing period, based on first lookup information DT1, the controller 1310, through the MCU 1312, generates the sensing temperature value D1 according to the offset raw data. In addition, during the temperature sensing period, based on second lookup information DT2, the controller 1310, through the DDIC 1311, generates the overdriving voltage D2 according to an offset voltage value corresponding to the sensing temperature value D1. The first lookup information DT1 may be stored in the MCU 1312.

In this embodiment, the first lookup information DT1 includes a correlation between capacitance of the touch sensors 1331*a* to 133Na and 1331*b* to 133Nb and temperature. The first lookup information DT1 may be, for example, represented as a lookup table, an equation, a diagram or other transforming information between the offset voltage values and the temperature.

Figure 15A:
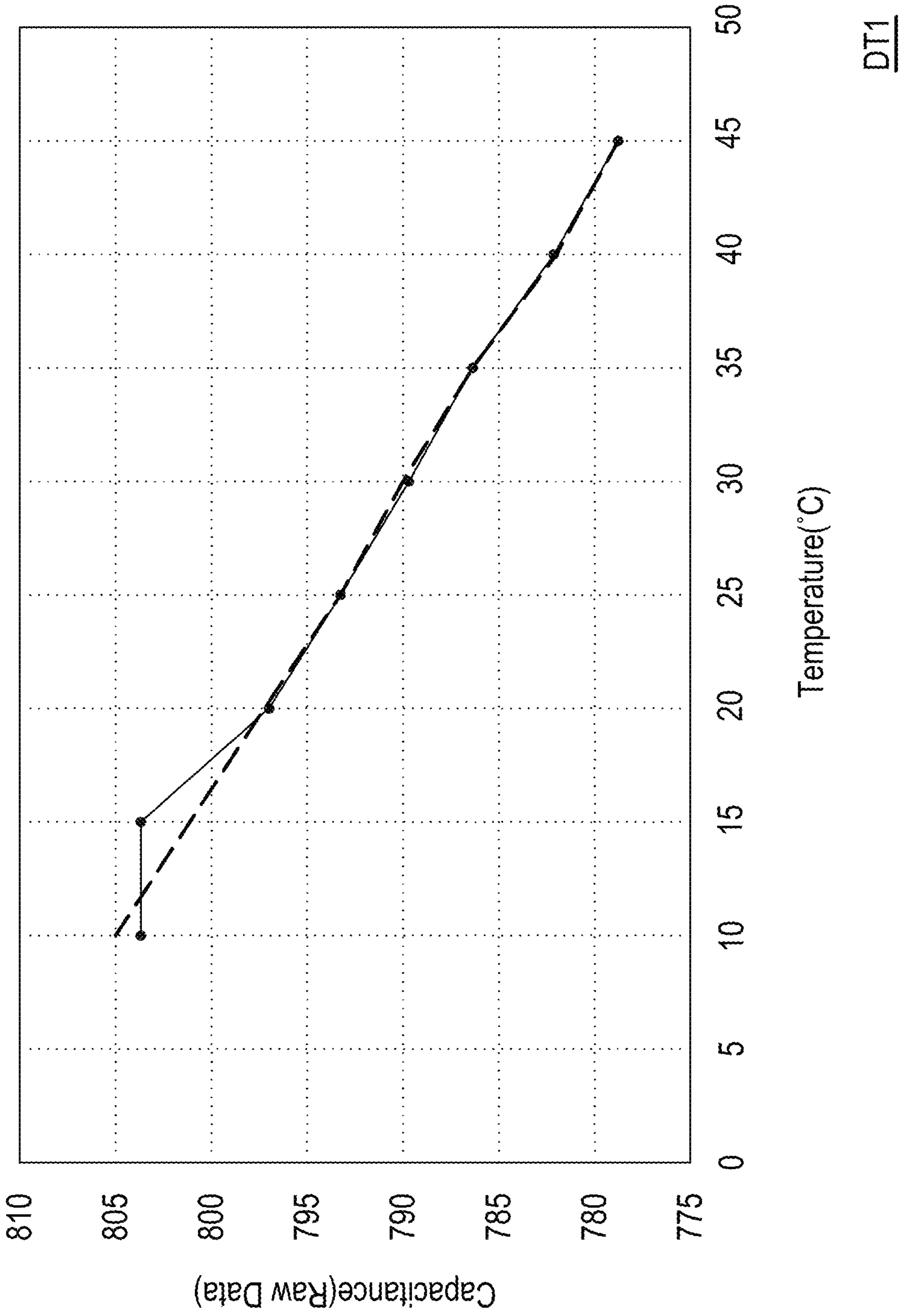
FIG. 15A is a schematic diagram of operations of the panel according to the embodiment of FIG. 13A of the disclosure.

For example, referring to FIGS. 13A and 15A, FIG. 15A is a schematic diagram of operations of the panel according to the embodiment of FIG. 13A of the disclosure, to illustrate an example of the first lookup information DT1 when the pixel circuit 1320*a* is applied with the LCD.

In the embodiment of FIG. 15A, the first lookup information DT1 is represented as a two-dimensional diagram. The horizontal axis represents the temperature of the panel 1300*a*, and the vertical axis represents the capacitance of the panel 1300*a*.

In the first lookup information DT1 as shown in FIG. 15A, the capacitance of the touch sensors 1331*a* to 133Na is referred to the averaged parasitic capacitance thereof, and is represented as the following equation (1). In the equation (1), Cs represents the parasitic capacitance of each touch sensors 1331*a* to 133Na, ε represents a permittivity of the medium of each touch sensors 1331*a* to 133Na, A represents an area of each touch sensors 1331*a* to 133Na, and d represents a thickness of the medium.

$$Cs = \varepsilon\frac{A}{d} \quad \text{equation (1)}$$

It should be noted that, since the baseline values of the touch sensors 1331*a* to 133Na at the certain temperature have a positive correlation with the parasitic capacitances of the touch sensors 1331*a* to 133Na, the raw data D0 also indicates the parasitic capacitances of the touch sensors 1331*a* to 133Na. As such, the first lookup information DT1 indicates the correlation between the raw data D0 (i.e., the capacitance of the touch sensors 1331*a* to 133Na) and the temperature. The raw data D0 of the first lookup information DT1 is referred to an averaged raw data D0 of the touch sensors 1331*a* to 133Na, which is the raw data D0 of the whole panel 1300*a*.

Furthermore, the correlation of the first lookup information DT1 is associated with a material of the touch sensors 1331*a* to 133Na. In the application of the LCD touch display panel 1300*a*, the material of the touch sensors 1331*a* to 133Na includes a metal oxide material (e.g., ITO material), and the touch sensors 1331*a* to 133Na has low sensitivity to the temperature. Based on the above equation (1), when the temperature changes (e.g., increases), a variation of the area "A" is less than a variation of the thickness "d", and the parasitic capacitance "Cs" decreases accordingly. As such, the capacitance of the touch sensors 1331*a* to 133Na and the temperature have a negative correlation.

Figure 15B:
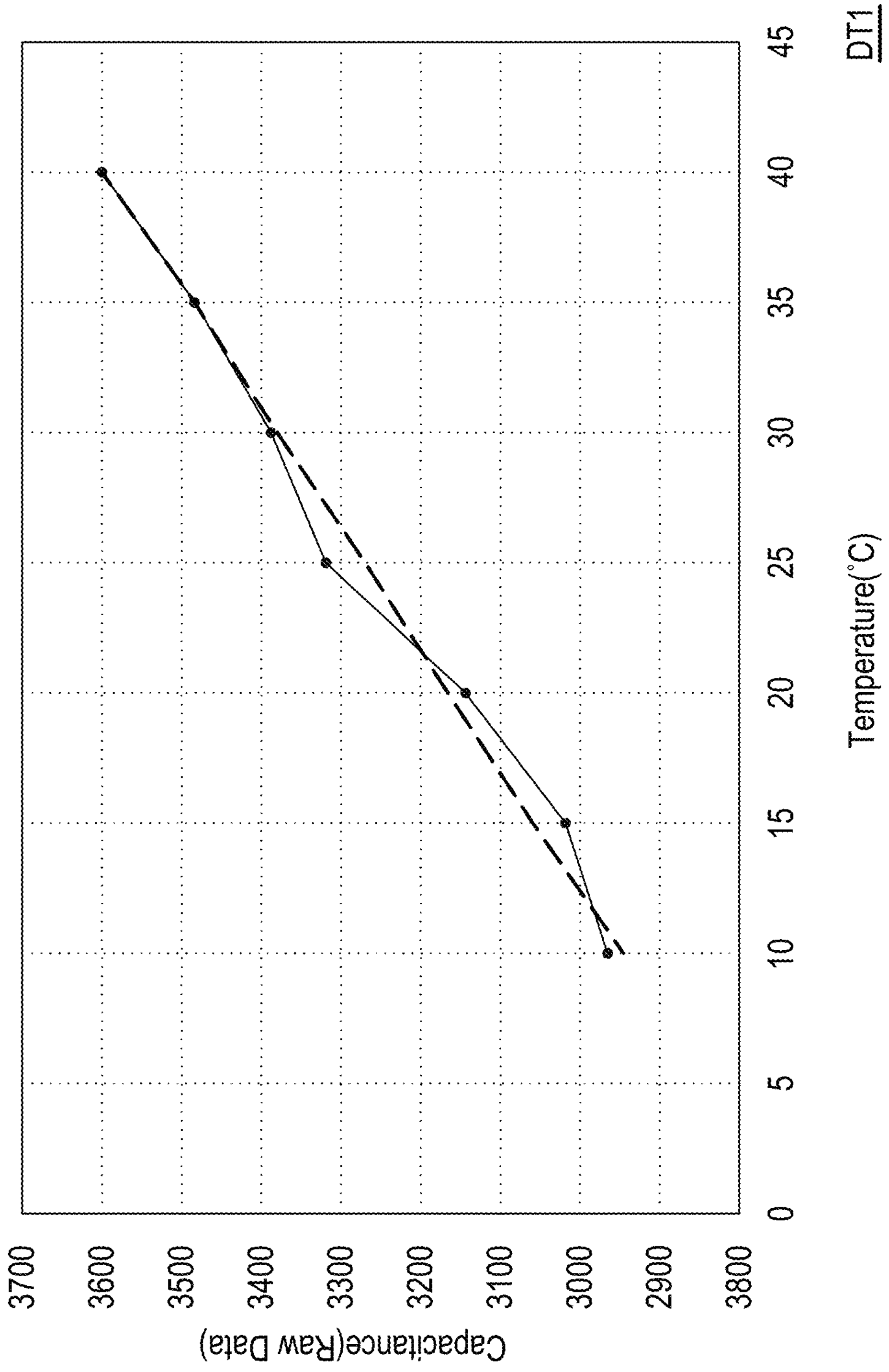
FIG. 15B is a schematic diagram of operations of the panel according to the embodiment of FIG. 13B of the disclosure.

In another example, referring to FIGS. 13B and 15B, FIG. 15B is a schematic diagram of operations of the panel according to the embodiment of FIG. 13B of the disclosure, to illustrate an example of the first lookup information DT1 when the pixel circuit 1320*b* is applied with the LED or OLED.

Compared with the embodiment of FIGS. 13A and 15A, in the first lookup information DT1 shown in FIG. 15B, the correlation between capacitance of the touch sensors 1331*b* to 133Nb and the temperature may be a positive correlation. In the application of the LED/OLED touch display panel 1300*b*, the material of the touch sensors 1331*b* to 133Nb includes a metal material (e.g., metal mesh structure), and the touch sensors 1331*b* to 133Nb has high sensitivity to the temperature. Based on the above equation (1), when the temperature changes (e.g., increases), a variation of the area "A" is greater than a variation of the thickness "d", and the parasitic capacitance "Cs" increases accordingly. As such, the capacitance of the touch sensors 1331*b* to 133Nb and the temperature have a positive correlation.

Back to the step S1430, in detail, during the temperature sensing period, the controller 1310, through the MCU 1312, calculates the offset raw data and the first lookup information DT1 to generate the sensing temperature value D1. The MCU 1312 outputs the sensing temperature value D1 to the DDIC 1311.

That is, based on the first lookup information DT1 shown in FIG. 15A or 15B, the controller 1310, through the MCU 1312, lookups an offset temperature value corresponding to the offset raw data. The MCU 1312 offsets the reference temperature value (e.g., the room temperature value) by such offset temperature value to generate the sensing temperature value D1.

Alternatively, based on the first lookup information DT1 shown in FIG. 15A or 15B, the controller MCU 1312 performs a linear interpolation on the offset raw data, the room temperature value (i.e., 25° C.) and the raw data corresponding to the room temperature, to generate the sensing temperature value D1.

Continued in the step S1430, during the temperature sensing period, the controller 1310, through the DDIC 1311, calculates the sensing temperature value D1 and the second lookup information DT2 to generate an offset voltage value. The second lookup information DT2 may be stored in the DDIC 1311.

In this embodiment, the second lookup information DT2 includes a correlation between offset voltage values of the pixel circuit 1320*a*/1320*b* and temperature. The second lookup information DT2 may be, for example, represented as a lookup table, an equation, a diagram or other transforming information between the offset voltage values and the temperature.

For example, in the application of the LCD touch display panel 1300*a*, the second lookup information DT2 may be the lookup information DT shown in FIG. 5. The pixel units 1321*a* of the pixel circuit 1320*a* are implemented by LCD units, hereinafter, the LCD units 1321*a*. That is, the offset voltage values of the pixel circuit 1320*a* and the temperature have a negative correlation.

Continued in the step S1430, during the temperature sensing period, the controller 1310, through the DDIC 1311, compensates a reference overdriving voltage corresponding to a reference temperature value according to the above offset voltage value to generate the overdriving voltage D2. Based on the second lookup information DT2 shown in FIG. 5, the operations regarding to generate the overdriving voltage D2 in the step S1430 may be described with reference to and by analogy with the step S420 in FIG. 4.

In step S1441, in the application of the LCD touch display panel 1300*a*, compared with the room temperature value (i.e., 25° C.), when the sensing temperature value D1 is low, the LC of the LCD units 1321*a* slows down the twisting.

In step S1451, in the application of the LCD touch display panel 1300*a*, during the temperature sensing period, the controller 1310, through the DDIC 1311, outputs the overdriving voltage D2 to the pixel circuit 1320*a*, to accelerate the twisting of the LCD units 1321*a*. In the application of the LCD touch display panel 1300*a*, the operations regarding to output the overdriving voltage D2 in the situation of the steps S1441 and S1451 may be described with reference to and by analogy with the steps S431 and S441 in FIG. 4.

Alternatively, in the application of the LED/OLED touch display panel 1300*b*, the second lookup information DT2 may be the lookup information DT shown in FIG. 8. The pixel units 1321*b* of the pixel circuit 1320*b* are implemented by LED units, and in particular, OLED units, hereinafter, the OLED units 1321*b*. That is, the offset voltage values of the pixel circuit 1320*b* and the temperature have a positive correlation.

In this embodiments, based on the second lookup information DT2 shown in FIG. 8, the operations regarding to generate the overdriving voltage D2 in the step S1430 may be described with reference to and by analogy with the step S720 in FIG. 7.

In the step S1441, in the application of the OLED touch display panel 1300*b*, compared with the room temperature value (i.e., 25° C.), when the sensing temperature value D1 is low, the currents output from the driving transistor of the OLED units 1321*b* are increased.

In step S1451, in the application of the OLED touch display panel 1300*b*, during the temperature sensing period, the controller 1310, through the DDIC 1311, outputs the overdriving voltage D2 to the pixel circuit 1320*b*, to decrease the currents output from the OLED units 1321*b*. in the application of the OLED touch display panel 1300*b*, the operations regarding to output the overdriving voltage D2 in the situation of the steps S1441 and S1451 may be described with reference to and by analogy with the steps S731 and S741 in FIG. 7.

On the other hand, in step S1442, in the application of the LCD touch display panel 1300*a*, compared with the room temperature value (i.e., 25° C.), when the sensing temperature value D1 is high, the LC of the LCD units 1321*a* speeds up the twisting.

In step S1452, in the application of the LCD touch display panel 1300*a*, during the temperature sensing period, the controller 1310, through the DDIC 1311, outputs the overdriving voltage D2 to the pixel circuit 1320*a*, to retard the twisting of the LCD units 1321*a*. In the application of the LCD touch display panel 1300*a*, the operations regarding to output the overdriving voltage D2 in the situation of the steps S1441 and S1451 may be described with reference to and by analogy with the steps S432 and S442 in FIG. 4.

Alternatively, in the step S1442, in the application of the OLED touch display panel 1300*b*, compared with the room temperature value (i.e., 25° C.), when the sensing temperature value D1 high, the currents output from the driving transistor of the OLED units 1321*b* are decreased.

In step S1452, in the application of the OLED touch display panel 1300*b*, during the temperature sensing period, the controller 1310, through the DDIC 1311, outputs the overdriving voltage D2 to the pixel circuit 1320*b*, to increase the currents output from the OLED units 1321*b*. In the application of the OLED touch display panel 1300*b*, the operations regarding to output the overdriving voltage D2 in the situation of the steps S1441 and S1451 may be described with reference to and by analogy with the steps S732 and S742 in FIG. 7.

Figure 16:
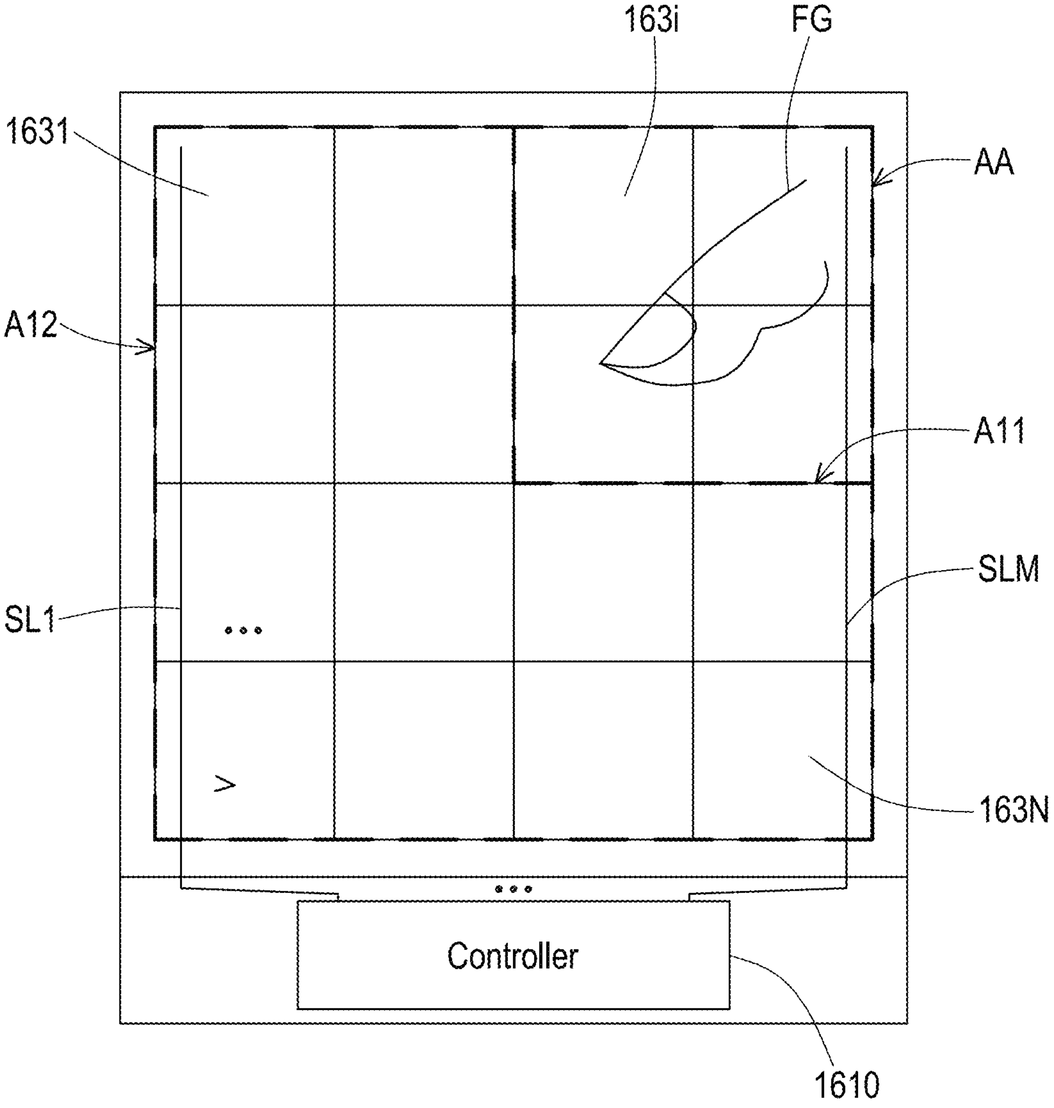
FIG. 16 is a schematic diagram of operations of a panel according to an embodiment of the disclosure.

FIG. 16 is a schematic diagram of operations of a panel according to an embodiment of the disclosure. Referring to FIG. 16, a panel 1600 includes a controller 1610, a pixel circuit (not shown in FIG. 16), multiple touch sensors 1631 to 163N, and multiple data lines SL1 to SLM, wherein N and M respectively are integers. The controller 1610 is coupled to the pixel circuit through the data lines SL1 to SLM. The panel 1600 is implemented by an LCD touch display panel or an LED/OLED touch display panel. The controller 1610, the pixel circuit and the touch sensors 1631 to 163N may be described with reference to and by analogy with the panel 1100, the panel 1300*a* or the panel 1300*b*.

In the embodiment of FIG. 16, during the touch sensing period (i.e., the temperature sensing period), the controller 1600 determines which regions of the panel 1600 to perform a touching method to implement the touching function, according to a magnitude order of the obtained raw data D0. The controller 1610 further determines which regions of the panel 1600 to perform a method to implement the temperature detecting function and an improvement of the color shift problems, according to the magnitude order of the obtained raw data D0. Such method is referred to a method for generating the overdriving voltage based on the detected temperature, as illustrated in FIG. 12 or FIG. 14.

In detail, the controller 1610 divides an active area AA of the panel 1600 into a first region A11 and a second region A12, according to a magnitude order of the obtained raw data D0. Specifically, the controller 1610 compares a default magnitude order with each one of the raw data D0 corresponding to the touch sensing signals output from touch sensors 1631 to 163N. The default magnitude order may be a default value to determine whether the raw data D0 corresponds to a signal-to-ratio (SNR) that is large enough.

That is, the default magnitude order is used for distinguishing whether any touch event happens.

When the magnitude order of some of the raw data D0 is lower than the default magnitude order, it represents that such raw data D0 indicates the baseline values of the corresponding touch sensors (e.g., including the touch sensors 1631 and 163N) without the touch event, and further indicates the current temperature of these touch sensors. The foresaid touch sensors (including the touch sensors 1631 and 163N) are located at the second region A12 where no finger FG is touched.

On the other hand, when the magnitude order of some of the raw data D0 is not lower than a default magnitude order, it represents that such raw data D0 indicates the baseline values of the corresponding touch sensors (e.g., including the touch sensor 163*i*) with the touch event. The foresaid touch sensors (including the touch sensor 163*i*) are located at the first region A11 where at least one finger FG is touched.

As such, based on the magnitude order of the obtained raw data D0, the controller 1610 divides the active area AA into the region A11 with the touch event and the remaining region A12 without the touch event. The region A11 with the touch event is a region where some touch sensors (including the touch sensor 163*i*) are located. The region A12 without the touch event is a region where the other touch sensors are located. Accordingly, the controller 1610 determines to perform the touching method for outputting the corresponding report coordinates at the region A11. Also, the controller 1610 determines to perform the method for sensing temperature at the region A12, as illustrated in FIG. 12 or FIG. 14.

Specifically, during the touch sensing period (i.e., the temperature sensing period), the controller 1610 collects the raw data D0 corresponding to the touch sensors 1631 to 163N (including the sensor 163*i*) arranged at the region A11. The foresaid raw data D0 has the magnitude order higher than the default magnitude order. As such, the controller 1610 performs the touch sensing operation at the region A11, according to the collected raw data D0 corresponding to the touch sensors 1631 to 163N (e.g., including the sensor 163*i*) arranged at the region A11.

In addition, during the touch sensing period (i.e., the temperature sensing period), the controller 1610 collects the raw data D0 corresponding to the touch sensors 1631 to 163N arranged at the region A12, to calculate the sensing temperature D1. The foresaid raw data D0 has the magnitude order lower than the default magnitude order. As such, the controller 1610 further determines to perform the method based on the sensing temperature D1, as illustrated in FIG. 12 or FIG. 14, at the region A12.

It should be noted that, based on the magnitude order of the obtained raw data D0, the controller 1610 determines at least one region (e.g., the region A11) where the touch event happens and the remaining region (e.g., the region A12) without the touch event. During the same period (i.e., the temperature sensing period), the controller 1610 performs the touching method and the method for generating the overdriving voltage based on the detected temperature at the same time. As such, the panel 1600 is capable of simultaneously calculating the report coordinates at the region A11, and calculating the temperature and the corresponding overdriving voltage at the region A12.

Figure 17:
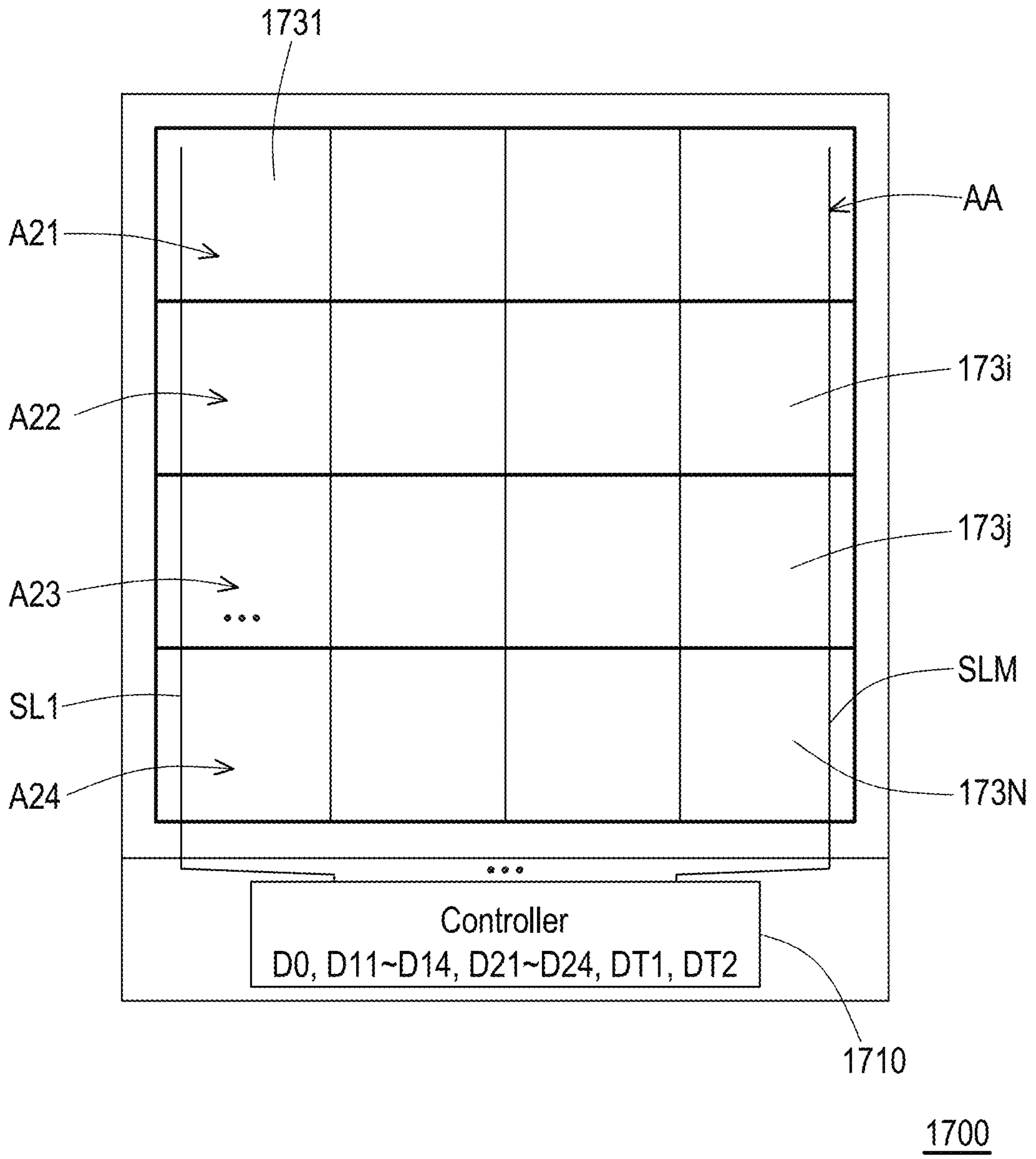
FIG. 17 is a schematic diagram of operations of a panel according to an embodiment of the disclosure.

FIG. 17 is a schematic diagram of operations of a panel according to an embodiment of the disclosure. Referring to FIG. 17, a panel 1700 includes a controller 1710, a pixel circuit (not shown in FIG. 17), multiple touch sensors 1731 to 173N, and multiple data lines SL1 to SLM, wherein N and M respectively are integers. The controller 1710 is coupled to the pixel circuit through the data lines SL1 to SLM. The panel 1700 is implemented by an LCD touch display panel or an LED/OLED touch display panel. The controller 1710, the pixel circuit, and the touch sensors 1731 to 173N may be described with reference to and by analogy with the panel 1100, the panel 1300*a* or the panel 1300*b*.

In the embodiment of FIG. 17, during the touch sensing period (i.e., the temperature sensing period), the controller 1700 performs a method on multiple divided regions of the panel 1700, to generating respective overdriving voltages for overdriving the corresponding pixel units accordingly. Such method is referred to a method for generating the overdriving voltage based on the detected temperature, as illustrated in FIG. 12 or FIG. 14.

In this embodiment, the controller 1710 divides an active area AA of the panel 1700 into a plurality of regions A21 to A24. With respect to a Y-direction, the regions A21 to A24 are adjacent sequentially. The quantities and arrangements of the regions A21 to A24 are only examples.

In this embodiment, each one of the regions A21 to A24 has a number of the touch sensors 1731 to 173N. Specifically, some of the touch sensors 1731 to 173N (e.g., including the touch sensor 1731) are arranged in the region A21. Some of the touch sensors 1731 to 173N (e.g., including the touch sensor 173*i*) are arranged in the region A22. Some of the touch sensors 1731 to 173N (e.g., including the touch sensor 173*j*) are arranged in the region A23, and the others (e.g., including the touch sensor 173N) are arranged in the region A24.

In detail, the controller 1710 divides the active area AA into these regions A21 to A24 according to distances between the touch sensors 1731 to 173N and the controller 1710. In this embodiment, with respect to the Y-direction, relative to the controller 1710, the region A21 may be, for example, a far-end region, the regions A22 and A23 may be, for example, middle-end regions, and the region A24 may be, for example, a near-end region. Alternatively, in another embodiment, the controller 1710 divides the active area AA into multiple regions A21 to A24 according to the design requirement of the touch display panel 1700.

For example, with respect to the Y-direction, since each one of the distances between the touch sensors (e.g., the touch sensor 1731) in the region A21 and the controller 1710 is greater than a first default distance, a second default distance and a third default distance, the controller 1710 sets an area where these touch sensors are located as the region A21. With respect to the Y-direction, since each one of the distances between the touch sensors (e.g., the touch sensor 173*i*) in the region A22 and the controller 1710 is greater than the first default distance and the second default distance, and is further less than the third default distance, the controller 1710 sets an area where these touch sensors are located as the region A22.

Furthermore, with respect to the Y-direction, since each one of the distances between the touch sensors (e.g., the touch sensor 173*j*) in the region A23 and the controller 1710 is greater than the first default distance, and is further less than the second default distance and the third default distance, the controller 1710 sets an area where these touch sensors are located as the region A23. With respect to the Y-direction, since each one of the distances between the touch sensors (e.g., the touch sensor 173N) in the region A24 and the controller 1710 is less than all of the default distances, the controller 1710 sets an area where these touch sensors are located as the region A23. The various default distances are preset according to the design requirement.

In this embodiment, the controller 1710 further respectively collects the raw data D0 corresponding to the touch sensors 1731 to 173N arranged at the regions A21 to A24. Alternatively stated, the controller 1710 collects the raw data D0 corresponding to the touch sensors (including, the touch sensor 1721) arranged at the region A21, in order to calculate the temperature value at such region A1. The collected raw data D0 from the regions A22 to A24 may be described with reference to and by analogy with the collected raw data D0 from the region A21.

Then, the controller 1710 calculates a plurality of sensing temperatures D11 to D14 at the divided regions A21 to A24, according to the raw data D0 corresponding to the touch sensors 1731 to 173N arranged at these regions A21 to A24 and the first lookup information DT1.

Alternatively stated, based on the first lookup information DT1, the controller 1710 calculates the sensing temperatures D11 according to the raw data D0 corresponding to the touch sensors (including, the touch sensor 1731) arranged at the region A11. Such sensing temperatures D11 indicates the current temperature of the region A11. The details of the calculation on the sensing temperatures D11 may be described with reference to and by analogy with operations regarding to the sensing temperature value D1 in the steps S1420 to S1430 in FIG. 14. The calculated sensing temperatures D12 to D14 corresponding to the regions A22 to A24 may be described with reference to and by analogy with the calculated sensing temperatures D11 corresponding to the regions A21.

In this embodiment, the controller 1710 generates a plurality of overdriving voltages D21 to D24 corresponding to the regions A21 to A24, according to the calculated sensing temperatures D11 to D14 at these regions A21 to A24 and the second lookup information DT2. The controller 1710 respectively outputs the overdriving voltages D21 to D24 to the pixel units of the pixel circuit arranged at the regions A21 to A24.

Alternatively stated, based on the second lookup information DT2, the controller 1710 calculates the overdriving voltage D21 according to the sensing temperatures D11 corresponding to the region A21. The controller 1710 outputs such overdriving voltage D21 to the pixel units arranged at the region A21, to overdrive these corresponding pixel units according to the overdriving voltage D21. The details of the operations regarding to the overdriving voltage D21 may be described with reference to and by analogy with operations regarding to the overdriving voltage D2 in the steps S1430 to S1452 in FIG. 14. The overdriving voltages D22 to D24 corresponding to the regions A22 to A24 may be described with reference to and by analogy with the overdriving voltage D21 corresponding to the regions A21.

It should be noted that, based on the divided regions A21 to A24, the controller 1710 is capable of detecting multiple sensing temperatures D11 to D14 at various regions A21 to A24. As such, the panel 1700 is capable of generating multiple overdriving voltages D21 to D24 for overdriving the various regions A21 to A24 respectively, in response to various current temperature at these regions A21 to A24.

Figure 18A:
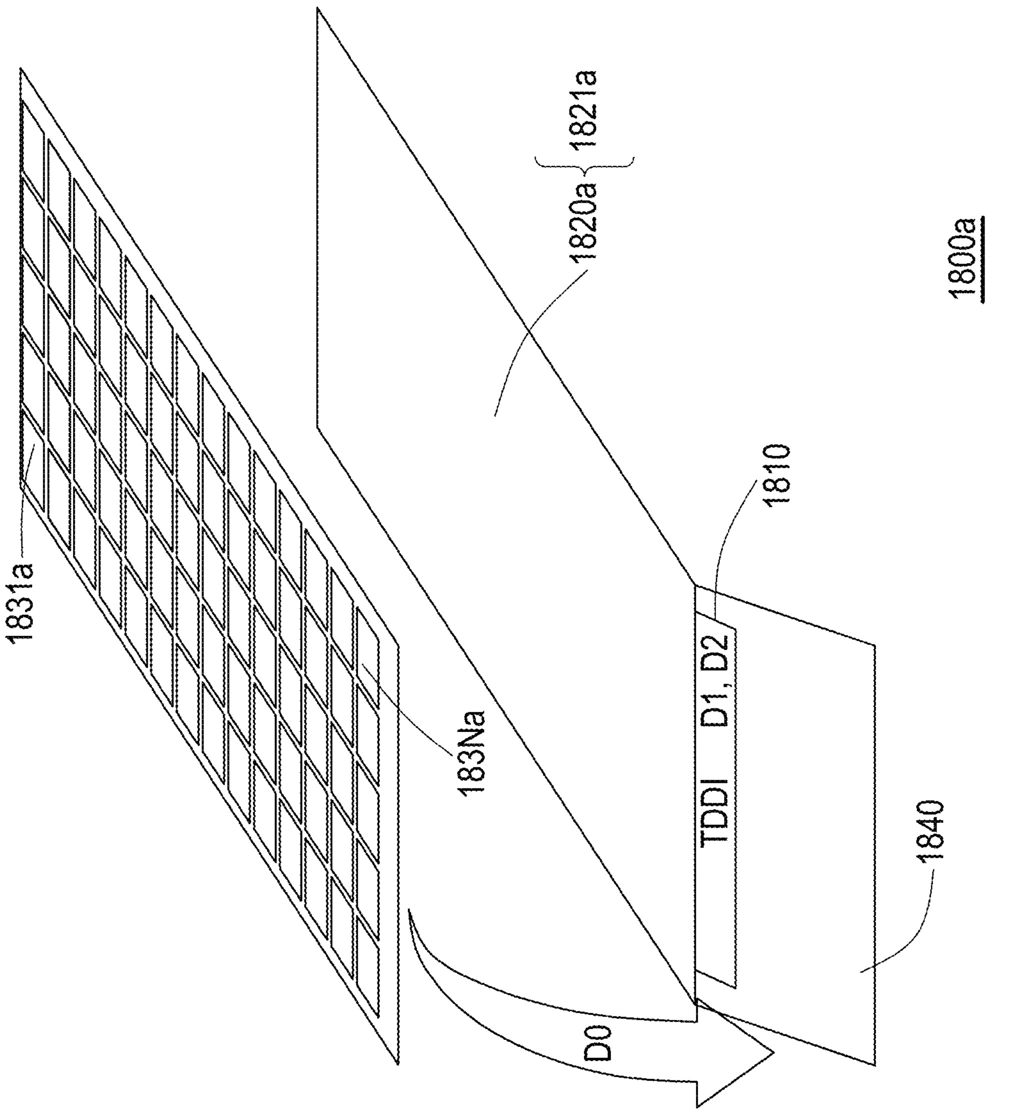
FIG. 18A is a circuit block diagram of a panel according to another embodiment of the disclosure.

FIG. 18A is a circuit block diagram of a panel according to another embodiment of the disclosure. Referring to FIG. 18A, a panel 1800*a* includes a controller 1810, a pixel circuit 1820*a*, and multiple touch sensors 1831*a* to 183Na, wherein Na is an integer. The controller 1810, the pixel circuit 1820*a* and the touch sensors 1831*a* to 183Na may be described with reference to and by analogy with the panel 1300*a*, the panel 1600 or the panel 1700.

In the embodiment of FIG. 18A, the panel 1800*a* is implemented by an LCD touch display panel. The pixel circuit 1820*a* is applied with the LCD. The pixel circuit 1820*a* includes multiple pixel units 1821*a* that are implemented by LCD units. The touch sensors 1831*a* to 183Na may be, for example, applied with an ITO material or other transparent conductive materials.

In this embodiment, the controller 1810 is implemented by the TDDI. Alternatively stated, the functions of the DDIC and the MCU are integrated together as one TDDI, to implement multiple functions, such as, the displaying function, the temperature detecting function and the touching function. The controller 1810 is arranged in a FPC 1840.

In this embodiment, the panel 1800*a* may perform the method for generating the overdriving voltage based on the detected temperature, as illustrated in FIG. 12 or FIG. 14. The panel 1800*a* may perform the touch sensing operation and the foresaid method at various regions, as illustrated in FIG. 16. The panel 1800*a* may perform the foresaid method on the divided regions, as illustrated in FIG. 17.

Figure 18B:
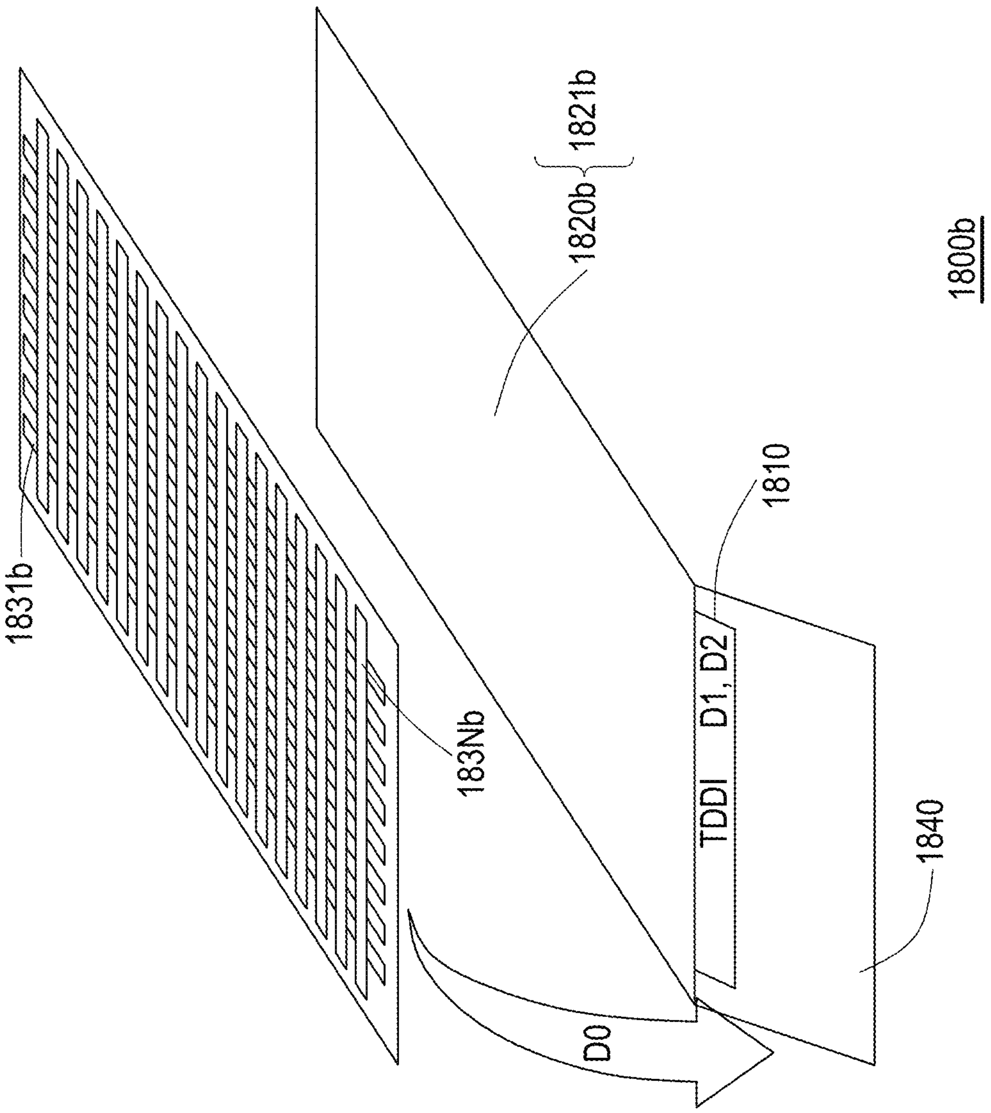
FIG. 18B is a circuit block diagram of a panel according to another embodiment of the disclosure.

FIG. 18B is a circuit block diagram of a panel according to another embodiment of the disclosure. Compared with the embodiment of FIG. 18A, in the FIG. 18B, a panel 1800*b* is implemented by a LED touch display panel, and in particular, is implemented by an OLED touch display panel. The pixel circuit 1820*b* is applied with the LED, and in particular, is applied with the OLED. The pixel circuit 1820*b* includes multiple pixel units 1821*b* that are implemented by LED units, and in particular, OLED units. The touch sensors 1831*b* to 183Nb may be, for example, applied with a metal mesh structure or other conductive structures.

To sum up, in the method for generating overdriving voltage based on temperature of panel of the embodiments of the disclosure, with the utilization of the built-in temperature detector or the raw data corresponding to the touch sensors, the panel is capable of detecting the current temperature of the panel without an external temperature detector. As such, the panel is capable of reducing the cost, and may be utilized in the narrow frame application. In some embodiments, based on the detected temperature and the second lookup table, the panel is capable of generating the overdriving voltage, so as to improve the color shift problems. In some embodiments, based on the magnitude order of the obtained raw data, the panel is capable of implementing the touching function and generating the overdriving voltage at the same time. In some embodiments, based on the divided regions of the active area, the panel is capable of detecting the current temperature at these regions, and is further capable of generating the respective overdriving voltages.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An operating method, adapted to a panel which comprises a controller, a plurality of touch sensors and a pixel circuit, wherein the operating method comprises:

obtaining, by the controller, raw data according to touch sensing signals output from the plurality of touch sensors during a temperature sensing period;

dividing, by the controller, an active area of the panel into a first region and a second region, according to a magnitude order of the obtained raw data;

collecting, by the controller, the raw data corresponding to the plurality of touch sensors arranged at the first region, which has the magnitude order lower than a default magnitude order, to calculate a sensing temperature;

calculating, by the controller, the sensing temperature value, according to the raw data and first lookup information;

generating, by the controller, an overdriving voltage, according to the sensing temperature value and second lookup information; and outputting, by the controller, the overdriving voltage to the pixel circuit.

2. The operating method according to claim 1, wherein a step of calculating the sensing temperature value of the panel according to the raw data and the first lookup information comprises:

comparing, by the controller, the raw data with reference raw data to generate offset raw data;

calculating, by the controller, the offset raw data and the first lookup information to generate the sensing temperature value.

3. The operating method according to claim 1, wherein a step of generating the overdriving voltage according to the sensing temperature value and the second lookup information comprises:

calculating, by the controller, the sensing temperature value and the second lookup information to generate an offset voltage value; and compensating, by the controller, a reference overdriving voltage corresponding to a reference temperature value according to the offset voltage value to generate the overdriving voltage.

4. The operating method according to claim 1, further comprising:

respectively collecting, by the controller, the raw data corresponding to the plurality of touch sensors arranged at a plurality of regions of the panel;

calculating, by the controller, a plurality of sensing temperatures at the plurality of regions, according to the raw data corresponding to the plurality of touch sensors arranged at the plurality of regions and the first lookup information;

generating, by the controller, a plurality of overdriving voltages corresponding to the plurality of regions, according to the plurality of sensing temperatures at the plurality of regions and the second lookup information; and respectively outputting, by the controller, the plurality of overdriving voltages to pixel units of the pixel circuit arranged at the plurality of regions.

5. The operating method according to claim 4, wherein each one of the first region and the second region has a number of the plurality of touch sensors.

6. The operating method according to claim 1, further comprising:

collecting, by the controller, the raw data corresponding to the plurality of touch sensors arranged at the second region, which has the magnitude order higher than the default magnitude order; and performing, by the controller, a touch sensing operation on the second region, according to the collected raw data corresponding to the plurality of touch sensors arranged at the second region.

7. The operating method according to claim 1, wherein the first lookup information comprises a correlation between capacitance of the plurality of touch sensors and temperature.

8. The operating method according to claim 1, wherein the second lookup information comprises a correlation between offset voltage values of the pixel circuit and temperature.

9. The operating method according to claim 8, wherein the pixel circuit comprises a plurality of liquid crystal display (LCD) units, the offset voltage values of the pixel circuit and the temperature have a negative correlation.

10. The operating method according to claim 8, wherein the pixel circuit comprises a plurality of light-emitting diode (LED) units, the offset voltage values of the pixel circuit and the temperature have a positive correlation.

11. The operating method according to claim 1, wherein the temperature sensing period is a period when the plurality of touch sensors perform a touch sensing operation.

12. The operating method according to claim 1, wherein the temperature sensing period is a period when the plurality of touch sensors do not perform a touch sensing operation and the pixel circuit does not perform a displaying operation.

* * * * *